US012770318B2

(12) United States Patent
Ishiwaka et al.

(10) Patent No.: US 12,770,318 B2
(45) Date of Patent: Oct. 20, 2026

(54) INFORMATION PROCESSING METHOD, NON-TRANSITORY COMPUTER-READABLE STORAGE MEDIUM, AND INFORMATION PROCESSING DEVICE FOR TRAINING MACHINE LEARNING MODEL

(71) Applicants: SoftBank Corp., Tokyo (JP); NeuralX Inc., Los Angeles, CA (US)

(72) Inventors: Yuko Ishiwaka, Tokyo (JP); Masaki Nakada, Los Angeles, CA (US)

(73) Assignees: SOFTBANK CORP., Tokyo (JP); NEURALX INC., Los Angeles, CA (US)

( * ) Notice: Subject to any disclaimer, the term of this patent is extended or adjusted under 35 U.S.C. 154(b) by 127 days.

(21) Appl. No.: 18/418,388

(22) Filed: Jan. 22, 2024

(65) Prior Publication Data

US 2024/0161467 A1 May 16, 2024

Related U.S. Application Data

(62) Division of application No. 17/875,428, filed on Jul. 28, 2022, now abandoned.

(51) Int. Cl.
*G06T 15/20* (2011.01)
*A01K 61/95* (2017.01)
*G06T 11/10* (2026.01)
*G06V 10/774* (2022.01)
*G06V 40/10* (2022.01)

(52) U.S. Cl.
CPC .............. *G06T 15/20* (2013.01); *A01K 61/95* (2017.01); *G06T 11/10* (2026.01); *G06V 10/774* (2022.01); *G06V 40/10* (2022.01)

(58) Field of Classification Search
None
See application file for complete search history.

(56) References Cited

U.S. PATENT DOCUMENTS

2002/0093503 A1 7/2002 Nougaret et al.
2009/0229532 A1 9/2009 Herbert et al.
2020/0012894 A1* 1/2020 Lee ......................... G06F 18/24
2020/0116858 A1 4/2020 Nagai
(Continued)

FOREIGN PATENT DOCUMENTS

CA 3087370 A1 11/2019
EP 3484282 B1 9/2020
(Continued)

OTHER PUBLICATIONS

U.S. Final Office Action issued Jun. 25, 2024 in corresponding U.S. Appl. No. 17/875,428, 70 pages.
(Continued)

*Primary Examiner* — Sarah Le
(74) *Attorney, Agent, or Firm* — XSENSUS LLP

(57) ABSTRACT

An information processing method according to the application concerned is implemented in a computer; and includes obtaining a two-dimensional simulation image that is formed when a plurality of target subjects present in a three-dimensional simulation space is captured by a virtual camera, and generating the simulation image that visually displays information indicating the degree of overlapping of the plurality of target subjects in the simulation image.

19 Claims, 21 Drawing Sheets

(56) References Cited

U.S. PATENT DOCUMENTS

| | | | |
|---|---|---|---|
| 2023/0102365 A1 | 3/2023 | Quan et al. | |
| 2023/0154016 A1 * | 5/2023 | Ogawa | G06T 7/248 382/103 |
| 2023/0389530 A1 | 12/2023 | Nishikawa et al. | |

FOREIGN PATENT DOCUMENTS

| | | | |
|---|---|---|---|
| EP | 4220549 | A1 | 8/2023 |
| JP | H117233 | A | 1/1999 |
| JP | 2001344615 | A | 12/2001 |
| JP | 2008-242596 | A | 10/2008 |
| JP | 2008242596 | * | 10/2008 |
| JP | 2013084181 | * | 5/2013 |
| JP | 2013084181 | A | 5/2013 |
| JP | 2018-013832 | A | 1/2018 |
| JP | 2022-055140 | A | 4/2022 |
| WO | 2019/045091 | A1 | 3/2019 |
| WO | 2019232247 | A1 | 12/2019 |
| WO | 2020/214699 | A1 | 10/2020 |

OTHER PUBLICATIONS

U.S. Office Action issued Jan. 19, 2024 in corresponding U.S. Appl. No. 17/875,428, 142 pages.

Mauri, G., et al, "Simulator software for marine fish farms sustainability." WSEAS Transactions on Environment and Development 3.12 (2007): 214-22. (Year: 2007).

Alvarez-Tunon, O., et al. "Generation and processing of simulated underwater images for infrastructure visual inspection with uuvs." Sensors 19.24 (2019): 5497 (Year: 2019).

Partial Supplementary European Search Report issued May 30, 2025 in corresponding European Patent Application No. 23846711.2, 14 pages.

International Search Report and Written Opinion of the International Searching Authority issued Aug. 29, 2023 in corresponding International Patent Application No. PCT/JP2023/027883 (English translation only), 9 pages.

Ishiwaka, Yuko et al., Foids: Bio-Inspired Fish Simulation for Generating Synthetic Datasets, [online], Dec. 2021, <URL: https://dl.acm.org/doi/10.I 145/3478513.3480520>, [retrieved on Aug. 15, 2023].

Extended European Search Report issued Oct. 22, 2026 in corresponding European Patent Application No. 22887111.7, 12 pages.

Li Daoliang et al: "Automatic recognition methods of fish feeding behavior in aquaculture: A review", Aquaculture, Elsevier, Amsterdam, NL, vol. 528, May 23, 2020 (May 23, 2020), XP086230145, ISSN: 0044-8486, DOI: 10.1016/J.AQUACULTURE.2020.735508 [retrieved on May 23, 2020].

Japanese Office Action issued Jan. 21, 2025 in corresponding Japanese Patent Application No. 2024-210280, 5 pages.

Hiroshi Nakamine, et al., "Effect of Autonomous Decentralized Mechanism in Fish Behavior", Journal of the System Control Information, Aug. 15, 1995, vol. 8, No. 8, 9 pages (with English Abstract).

Chigusa, et al., "New video synthesis based on flocking-behavior simulation", Technical Report, the Institute of Electronics, Information and Communication Engineers, Jul. 26, 2010, vol. 110, No. 148, 7 pages (with English Abstract).

* cited by examiner

INFORMATION PROCESSING METHOD, NON-TRANSITORY COMPUTER-READABLE STORAGE MEDIUM, AND INFORMATION PROCESSING DEVICE FOR TRAINING MACHINE LEARNING MODEL

CROSS-REFERENCE TO RELATED APPLICATION

The present application is a divisional of U.S. patent application Ser. No. 17/875,428, filed Jul. 28, 2022, the entire contents of which are incorporated herein by reference.

BACKGROUND OF THE INVENTION

1. Field of the Invention

The present invention is related to an information processing method, a non-transitory computer-readable storage medium, and an information processing device.

2. Description of the Related Art

The deep learning technology has been producing excellent results in the field of computer vision or sound recognition. For example, counting the number of fish present in a fish preserve of a farm has been an issue. However, it is expected that the use of the deep learning method would result in remedying the issue.

[Patent Literature 1] International Laid-open Pamphlet No. 2019/045091

The accuracy of the analysis based on deep learning is dependent on the training data. That is, in order to obtain the analysis result having a high degree of accuracy, a machine learning model needs to be trained in a large volume of training data covering a wide range of patterns. For example, in order to accurately estimate the information regarding a school of fish (for example, the number of fish) from a taken image in which the school of fish present in a fish preserve is captured using computer vision, a machine learning model needs to be trained in a large volume of training data covering the combinations of a wide range of conditions such as the fish species and the number of fish.

However, it is not an easy task to create a large volume of training data covering a wide range of patterns. For example, it is extremely difficult to create a large volume of training data by manually assigning correct-solution data to each image among an enormous number of images covering the combinations of a wide range of conditions.

In this way, if it is not possible to obtain a large volume of training data covering a wide range of patterns, then a machine learning model cannot be given a high-quality training. Hence, there are times when it becomes difficult to accurately estimate the information regarding a plurality of target subjects from the actual taken image.

In that regard, in the application concerned, it is an objective to provide an information processing method, a computer program product, and an information processing device that enable accurate estimation of the information regarding a plurality of target subjects.

SUMMARY OF THE INVENTION

It is an object of the present invention to at least partially solve the problems in the conventional technology.

According to one aspect of an embodiment, an information processing method according to the application concerned is implemented in a computer; and includes obtaining a two-dimensional simulation image that is formed when a plurality of target subjects present in a three-dimensional simulation space is captured by a virtual camera, and generating the simulation image that visually displays information indicating the degree of overlapping of the plurality of target subjects in the simulation image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
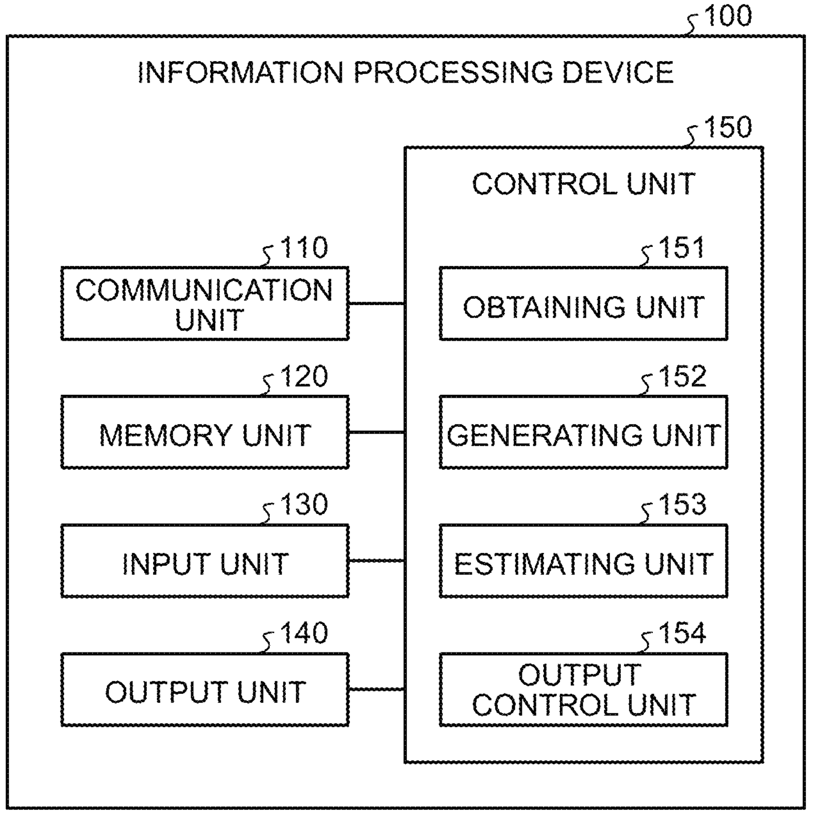
FIG. 1 is a diagram illustrating an exemplary configuration of an information processing device according to an embodiment.

An illustrative embodiment (hereinafter, called "embodiment") of an information processing method, a computer program product, and an information processing device is described below in detail with reference to the accompanying drawings. However, the information processing method, the computer program product, and the information processing device according to the application concerned is not limited by the embodiment described below. In the embodiment described below, identical regions are referred to by the same reference numerals, and their explanation is not repeated.

EMBODIMENT

1. To Begin with

In recent years, cultivation of fish has been attracting attention as a means for overcoming the global food problem. In order to supply high-quality fish by way of fish cultivation, it is important to precisely know the number of fish, which is deeply related to the feeding of the fish.

However, under the specific environment of the farm that is under water, sometimes it is difficult to utilize the overground IT technology. For that reason, conventionally, after using a net and manually scooping some of the fish for measuring purposes, the number of fish is visually counted. However, in this method, not only there is a large burden on the fish, but there is also the issue of lack of precision.

In that regard, in recent years, the focus is on a method in which the number of fish is automatically counted using computer vision from a taken image in which the school of fish present in a fish preserve is captured. As a specific example, a method is known in which a machine learning model for image recognition is trained to estimate the number of fish present in a school of fish as captured in a taken image. However, in order to estimate the number of fish from the taken image using a machine learning model, the machine learning model needs to be trained in a large volume of training data covering the combinations of a wide range of conditions such as the surrounding environment of the fish (for example, the season, the time, the weather, the water temperature, the light intensity, and the extent of water pollution) and the biological characteristics of the fish (for example, the fish species, the fish size, the speed, and the number of fish).

However, it is not an easy task to create a large volume of training data covering the combinations of a wide range of conditions. For example, it is extremely difficult to create a large volume of training data by manually assigning correct-solution data to each image among an enormous number of images covering the combinations of a wide range of conditions. Besides, in order to accurately estimate the number of fish from a taken image using a machine learning model, the quality of the training data also plays an important role. However, in the case of manually assigning the correct-solution data, it cannot always be said that the training data is of a high quality.

For example, in an image in which the school of fish swimming in a three-dimensional fish preserve is captured, sometimes the image includes a region in which there is overlapping of the fish present on the near side of the camera (hereinafter, also called the near-side fish) and the fish present on the far side (hereinafter, also called the far-side fish). Thus, in a taken image that includes a region in which there is overlapping of the near-side fish and the far-side fish, some part of the bodies of the far-side fish remains hidden, thereby making it difficult to visually identify the positions of the fish captured in the taken image. For that reason, with respect to a taken image that includes a region in which there is overlapping of the near-side fish and the far-side fish, for example, if an annotation task for enclosing the positions of the fish in a bounding box is to be performed manually, then sometimes it is difficult to assign annotations indicating the precise positions of the fish. Besides, since it is difficult to visually identify the positions of the fish captured in a taken image, the annotation result happens to be different according to the person who performed the annotation task.

In contrast, the information processing device according to the embodiment generates a simulation image that is meant for visually displaying the information indicating the degree of overlapping of a plurality of fish in a two-dimensional simulation image, which is formed when a plurality of fish present in a three-dimensional simulation space is captured by a virtual camera (see FIG. 16 explained later).

In this way, in the information processing device according to the embodiment, instead of using a taken image in which a school of fish actually present in a three-dimensional space (for example, a fish preserve) is captured, a simulation image is used that is formed when the school of fish present in a three-dimensional simulation space is captured by a virtual camera. As a result, the information processing device becomes able to automatically calculate the information indicating the degree of overlapping of a plurality of fish included in the simulation image. Moreover, the information processing device can assign, as the annotation to the simulation image, the information indicating the degree of overlapping of a plurality of fish. Hence, accurate and high-quality training data can be generated with ease. With that, for example, the information processing device enables training of a machine learning model, which is meant for estimating the information regarding the school of fish (for example, the number of fish) from the taken image, in a large volume of high-quality training data. That is, as a result of carrying out the training of a machine learning model, which is meant for estimating the information regarding the school of fish (for example, the number of fish) from the taken image, in a large volume of high-quality training data, the information processing device enables achieving enhancement in the estimation accuracy of the machine learning model. Thus, the information processing device enables accurate estimation of the information regarding the school of fish.

2. Configuration of Information Processing Device

FIG. 1 is a diagram illustrating an exemplary configuration of an information processing device 100 according to the embodiment. The information processing device 100 includes a communication unit 110, a memory unit 120, an input unit 130, an output unit 140, and a control unit 150.

Communication Unit 110

The communication unit 110 is implemented using, for example, a network interface card (NIC). The communication unit 110 is connected to a network in a wired manner or a wireless manner, and sends information to and receives information from a terminal device used by a supervisor of the fish.

Memory Unit 120

The memory unit 120 is implemented using, for example, a semiconductor memory device such as a random access memory (RAM) or a flash memory; or a memory device such as a hard disk or an optical disc. More particularly, the memory unit 120 is used to store various computer programs (an example of an information processing program) to be used in simulation. Moreover, the memory unit 120 is used to store the values of various parameters to be used in simulation.

Figure 2:
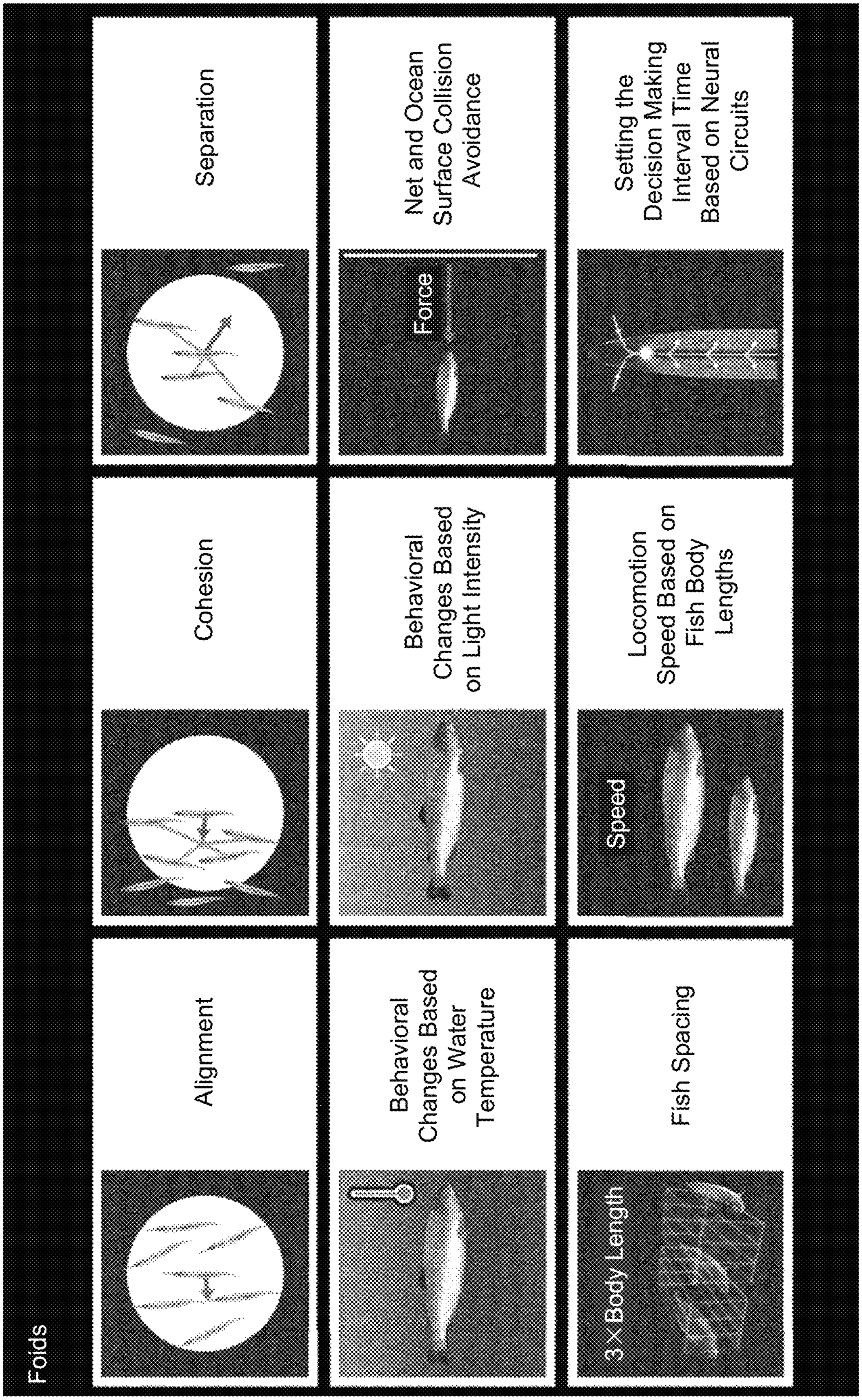
FIG. 2 is a diagram for explaining the overview of nine parameters used in generating a simulation image according to the embodiment.

FIG. 2 is a diagram for explaining the overview of nine parameters used in generating a simulation image according to the embodiment. Based on the nine parameters illustrated in FIG. 2, the information processing device according to the embodiment generates a simulation image in which the behavior exhibited by every fish in the school of fish is captured. In the upper row in FIG. 2 are illustrated fish school parameters that are related to three types of characteristics of the fish school behavior (namely, alignment, cohesion, and separation). In the middle row in FIG. 2 are illustrated external parameters that are related to the water temperature, the light intensity, and the net of the fish preserve. In the lower row in FIG. 2 are illustrated internal parameters such as the range over which a fish exhibits the fish school behavior, the relationship between the fish size and the locomotion speed, and the time required for a fish to make a decision. Regarding the nine parameters, the detailed explanation is given later.

Thus, based on the information regarding the biological characteristics of the fish, based on the information regarding the surrounding environment of the fish, and based on the characteristics of the fish school behavior exhibited by the fish; the information processing device 100 generates a simulation image that includes the behavior exhibited by a school of fish. That enables accurate reproduction of the behavior exhibited by the school of fish present in an actual fish preserve. Moreover, the information processing device 100 varies the values of a plurality of parameters used in generating simulation images, and thus can easily generate a large number of simulation images covering a wide range of patterns. Furthermore, the information processing device 100 can utilize the values of the parameters, which are used in generating simulation images, as the correct-solution data. Hence, as compared to the case of manually assigning the correct-solution data, a large volume of high-quality data can be generated with ease.

As a result, for example, the information processing device 100 enables training of a machine learning model, which is meant for estimating the information regarding the school of fish (for example, the number of fish) captured in a taken image, in a large volume of high-quality training data. That is, as a result of carrying out the training of a machine learning model, which is meant for estimating the information regarding the school of fish (for example, the number of fish) from the taken image, in a large volume of high-quality training data; the information processing device 100 enables achieving enhancement in the estimation accuracy of the machine learning model. Thus, the information processing device 100 enables accurate estimation of the information regarding the school of fish.

Input Unit 130

The input unit 130 receives input of various operations from the user. For example, the input unit 130 can receive various operations from the user according to touch-sensitive panel functions and via a display screen (for example, the output unit 140). Alternatively, the input unit 130 can receive various operations from buttons provided in the information processing device 100 or from a keyboard or a mouse connected to the information processing device 100.

Output Unit 140

The output unit 140 is a display screen implemented using, for example, a liquid crystal display or an organic electro-luminescence (EL) display, and represents a display device meant for displaying a variety of information. The output unit 140 displays a variety of information under the control of the control unit 150. Meanwhile, if a touch-sensitive panel is used in the information processing device 100, then the input unit 130 and the output unit 140 are integrated together. In the following explanation, the output unit 140 is sometimes referred to as the screen.

Control Unit 150

The control unit 150 is a controller and is implemented when, for example, a central processing unit (CPU) or a micro processing unit (MPU) executes various computer programs (equivalent to an example of an information processing program), which are stored in an internal memory device of the information processing device 100, while using a read only memory (RAM) as the work area. Alternatively, the control unit 150 is a controller and is implemented using, for example, an integrated circuit such as an application specific integrated circuit (ASIC) or a field programmable gate array (FPGA).

The control unit 150 includes, as function units, an obtaining unit 151, a generating unit 152, an estimating unit 153, and an output control unit 154 that can implement or execute the operations in the information processing explained later. Meanwhile, the internal configuration of the control unit 150 is not limited to the configuration illustrated in FIG. 1, and any other configuration can be adapted as long as the information processing (explained later) can be performed. Moreover, the function units only indicate the functions of the control unit 150, and need not always be physically distinguishable in the same manner.

Obtaining Unit 151

The obtaining unit 151 obtains the following: the values of the internal parameters regarding the biological characteristics of the fish; the values of the external parameters regarding the characteristics of the surrounding environment of the fish; and the values of fish school parameters regarding the characteristics of the fish school behavior indicating the behavior exhibited by the fish toward each other. More particularly, the obtaining unit 151 obtains the values of the internal parameters, the values of the external parameters, and the values of the fish school parameters as input by the user via the input unit 130.

More particularly, the obtaining unit 151 obtains the values of the internal parameters that are set for every fish belonging to the school of fish included in a simulation image. For example, when there are N number of fish (where N is a natural number) in the school of fish included in a simulation image, the obtaining unit 151 obtains N number of sets of values of internal parameters set for the N number of fish.

Moreover, the obtaining unit 151 obtains the values of the fish school parameters set for the school of fish included in a simulation image. The values of the fish school parameters are set in common to every fish in a school of fish. For example, when there are N number of fish (where N is a natural number) in the school of fish included in a simulation image, the obtaining unit 151 obtains the values of the fish school parameters set in common for all of the N number of fish.

Furthermore, the obtaining unit 151 obtains the values of the external parameters set for each type of surrounding environment of the school of fish included in a simulation image. For example, the obtaining unit 151 obtains the values of the external parameter that are set for the fish preserve in which the school of fish included in a simulation image is present. For example, the obtaining unit 151 obtains the values of the external parameters that are set to be different according to the depth of water in the fish preserve in which the school of fish included in a simulation image is present.

Generating Unit 152

The generating unit 152 controls, based on the values of the internal parameters, the values of the external parameters, and the values of the fish school parameters as obtained by the obtaining unit 151, the behavior exhibited by each individual fish belonging to the school of fish; and generates a simulation image. Explained below in detail with reference to FIGS. 3 to 8 is the case in which, based on the values of the internal parameters, the values of the external parameters, and the values of the fish school parameters, the generating unit 152 controls the behavior exhibited by every fish belonging to the school of fish.

Figure 3:
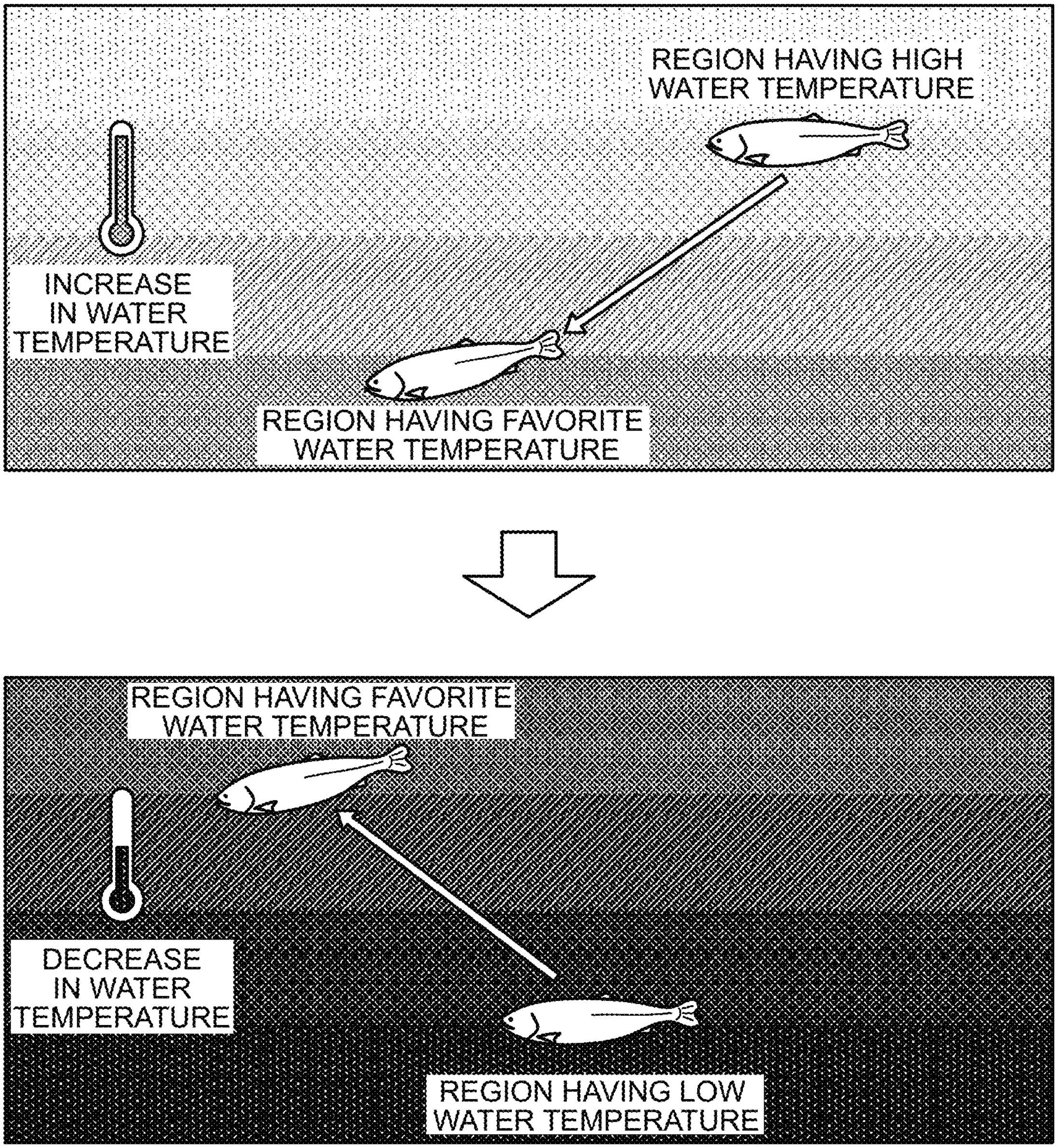
FIG. 3 is a diagram for explaining the relationship between the water temperature and the behavior exhibited by a fish.

FIG. 3 is a diagram for explaining the relationship between the water temperature and the behavior exhibited by a fish. As a biological characteristic of fish, each individual fish has a favorite water temperature, and it is known that a fish moves toward the region having the favorite water temperature. In the example illustrated in the upper part in FIG. 3, since the water temperature surrounding a fish is higher than the favorite water temperature of that fish, the generating unit 152 controls the behavior of the fish in such a way that the fish moves toward the region having the favorite water temperature. In the example illustrated in the lower part in FIG. 3, since the water temperature surrounding a fish is lower than the favorite water temperature of that fish, the generating unit 152 controls the behavior of the fish in such a way that the fish moves toward the region having the favorite water temperature. For example, the generating unit 152 controls the direction of movement of the fish in such a way that the fish moves in the direction of the region having the favorite water temperature. In this way, based on the favorite water temperature serving as the value of an internal parameter for each individual fish belonging to a school of fish, the generating unit 152 controls the behavior of each individual fish in such a way that the fish moves toward the region having the favorite water temperature.

It is known that the distribution of water temperature in a fish preserve differs according to the season (or the tide of the season) and the depth of the water. In the example illustrated in the upper part in FIG. 3, the season is summer and the water temperature in the fish preserve is high due to the inflow of the Kuroshio current into the fish preserve. In the summer, it is known that the water temperature in the fish preserve becomes higher toward the water surface of the fish preserve and becomes lower toward the bottom of the fish preserve. Thus, as the value of an external parameter, the generating unit 152 varies the distribution of water temperature in the fish preserve according to the water depth in such a way that the water temperature goes on increasing toward the water surface of the fish preserve and goes on decreasing toward the bottom of the fish preserve. In the example illustrated in the lower part in FIG. 3, the season is winter and the water temperature in the fish preserve is low due to the inflow of the Oyashio current into the fish preserve. In the winter, it is known that the water temperature in the fish preserve becomes lower toward the water surface of the fish preserve and becomes higher toward the bottom of the fish preserve. Thus, as the value of an external parameter, the generating unit 152 varies the distribution of water temperature in the fish preserve according to the water depth in such a way that the water temperature goes on decreasing toward the water surface of the fish preserve and goes on increasing toward the bottom of the fish preserve. In this way, as the value of an external parameter, based on the distribution of water temperature in the fish preserve in which the school of fish is present, the generating unit 152 controls the behavior of each individual fish in such a way that the fish moves toward the region having the favorite water temperature.

Meanwhile, as a biological characteristic of fish, it is known that, higher the surrounding water temperature, higher the locomotion speed of the fish; and that, lower the surrounding water temperature, lower is the locomotion speed of the fish. Thus, as the value of an internal parameter, based on the distribution of water temperature of the fish preserve in which the school of fish is present, the generating unit 152 controls the behavior of each individual fish belonging to the school of fish in such a way that that the locomotion speed of that fish increases as the surrounding water temperature becomes higher.

Figure 4:
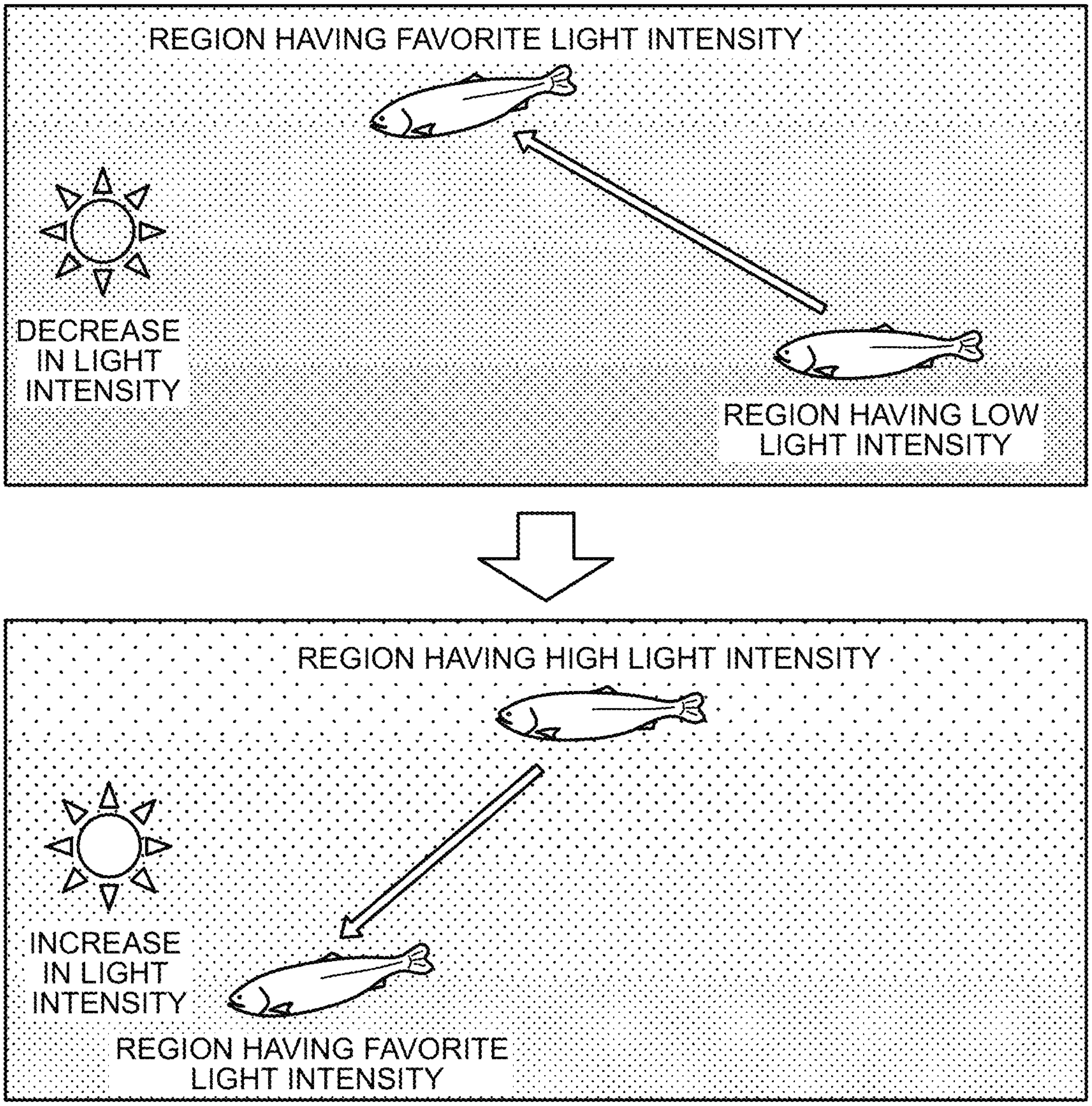
FIG. 4 is a diagram for explaining about the relationship between the light intensity and the behavior exhibited by a fish.

FIG. 4 is a diagram for explaining about the relationship between the light intensity and the behavior exhibited by a fish. As a biological characteristic of fish, each individual fish has a favorite light intensity, and it is known that the fish moves toward the region having the favorite light intensity. In the example illustrated in the upper part in FIG. 4, since the light intensity surrounding a fish is lower than the favorite light intensity of that fish, the generating unit 152 controls the behavior of the fish in such a way that the fish moves toward the region having the favorite light intensity. In the example illustrated in the lower part in FIG. 4, since the light intensity surrounding a fish is higher than the favorite light intensity of that fish, the generating unit 152 controls the behavior of the fish in such a way that the fish moves toward the region having the favorite light intensity. For example, the generating unit 152 controls the direction of movement of the fish in such a way that the fish moves in the direction of the region having the favorite light intensity. In this way, based on the favorite light intensity as the value of an internal parameter for each individual fish belonging to a school of fish, the generating unit 152 controls the behavior of each individual fish in such a way that the fish moves toward the region having the favorite light intensity.

It is known that the distribution of light intensity in a fish preserve differs according to the season, the time, the weather, and the water depth. In the example illustrated in the upper part in FIG. 4, the season is winter (or the time is in the morning or in the night) and the light intensity in the fish preserve is low. In the example illustrated in the lower part in FIG. 4, the season is summer (or the time is in the afternoon) and the light intensity in the fish preserve is high. Moreover, it is known that generally the light intensity in a fish preserve becomes higher toward the water surface of the fish preserve and becomes lower toward the bottom of the fish preserve. Thus, as the value of an external parameter, the generating unit 152 varies the distribution of light intensity in the fish preserve according to the water depth in such a way that the light intensity goes on increasing toward the water surface of the fish preserve and goes on decreasing toward the bottom of the fish preserve. In this way, as the value of an external parameter, based on the distribution of light intensity in the fish preserve in which the school of fish is present, the generating unit 152 controls the behavior of each individual fish in such a way that the fish moves toward the region having the favorite light intensity.

Figure 5:
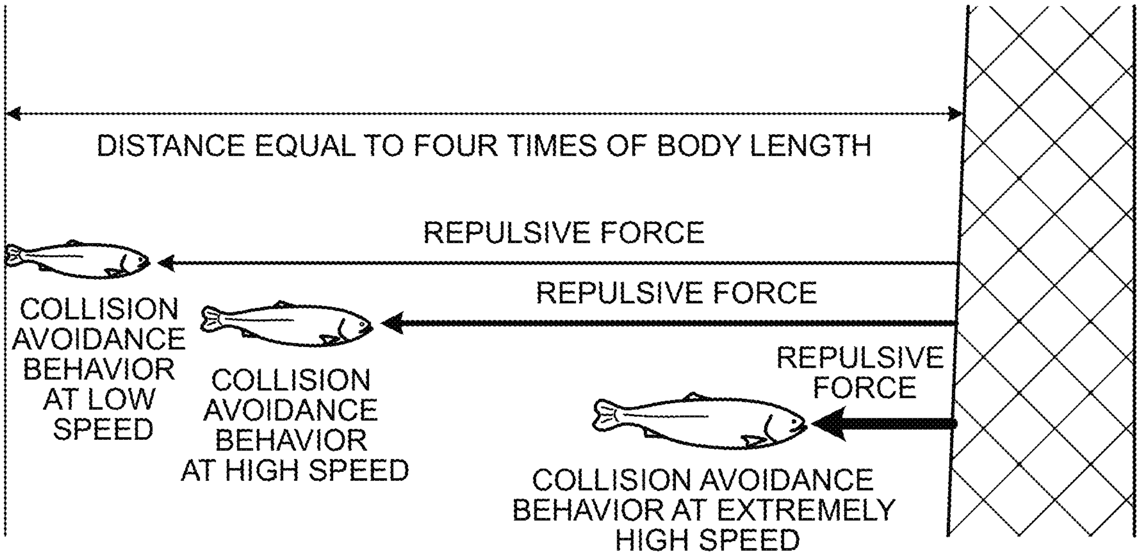
FIG. 5 is a diagram for explaining about the relationship between the net of a fish preserve and the behavior exhibited by a fish.

FIG. 5 is a diagram for explaining about the relationship between the net of a fish preserve and the behavior exhibited by a fish. As a biological characteristic of fish, it is known that, when a fish approaches an obstacle such as the net of the fish preserve or the water surface of the fish preserve, the fish exhibits an avoidance behavior for avoiding the obstacle. The inventor(s) of the present invention obtained the experimental result indicating that, when the distance between a fish and an obstacle becomes equal to or shorter than four times of the body length of the fish, the fish detects the obstacle and exhibits an avoidance behavior to avoid the obstacle. In that regard, as the value of an internal parameter, when the distance between a fish belonging to the school of fish and an obstacle is equal to or shorter than a predetermined threshold value (for example, the length equal to a predetermined multiple of the body length of the fish), the generating unit 152 controls the behavior of the fish in such a way that the fish exhibits an avoidance behavior to avoid an obstacle.

Moreover, as illustrated in FIG. 5, as a biological characteristic of fish, it is known that shorter (longer) the distance between a fish and the net of the fish preserve, the higher (lower) is the speed of the fish in exhibiting a collision avoidance behavior. Thus, based on the repulsive force that increases as the distance between a fish belonging to the school of fish and an obstacle becomes shorter, the generating unit 152 controls the behavior of the fish. Herein, the repulsive force implies the force by which a fish attempts to move away from an obstacle in order to avoid collision with the obstacle. For example, when the distance between a fish and an obstacle is equal to or shorter than a predetermined threshold value, the generating unit 152 controls the behavior of the fish based on the repulsive force that is proportional to the distance between the fish and the obstacle. For example, the generating unit 152 applies the repulsive force in the opposite direction to the direction of movement of the fish (in FIG. 5, the direction toward the net of the fish preserve), and controls the behavior of the fish in such a way that the fish avoids the obstacle (in FIG. 5, the net of the fish preserve). In this way, as the value of an internal parameter, when the distance between a fish belonging to the school of fish and an obstacle is equal to or shorter than a predetermined threshold value, the generating unit 152 controls the behavior of the fish based on the repulsive force acting on the fish.

Figure 6:
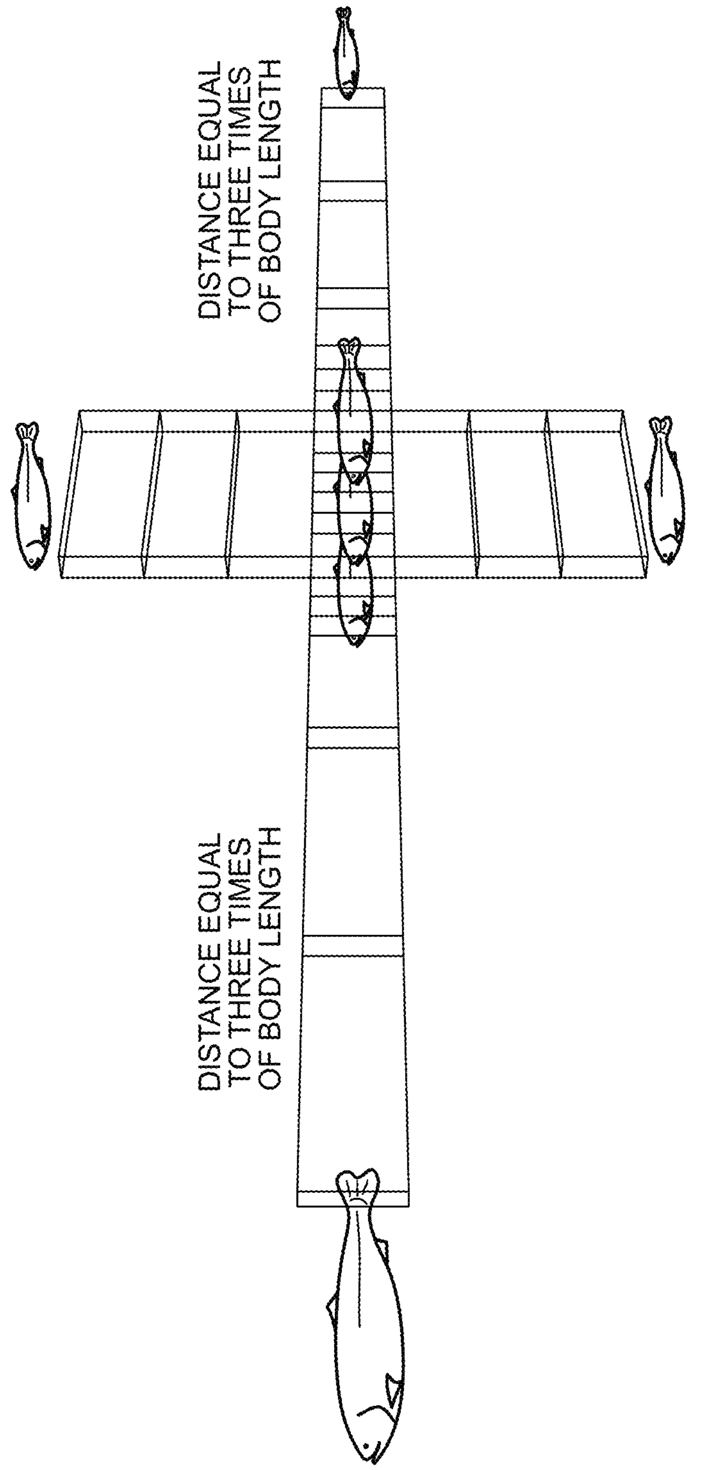
FIG. 6 is a diagram for explaining about the range over which a fish exhibits the fish school behavior with respect to other fish.

FIG. 6 is a diagram for explaining about the range over which a fish exhibits the fish school behavior with respect to other fish. As a biological characteristic of fish, it is known that a fish exhibits the fish school behavior with respect to the other fish present around itself. The inventor(s) of the present invention obtained the experimental result indicating that a fish detects other fish present within the range equal to thrice its own body length, and exhibits the fish school behavior with respect to the other fish present within the range equal to thrice its own body length. Thus, as the value of a fish school parameter, when a predetermined range from the position of a fish belonging to the school of fish (for example, the range equal to a predetermined multiple of the body length of a fish) includes other fish, the generating unit 152 controls the behavior of the concerned fish in such a way that the concerned fish exhibits the fish school behavior.

Herein, the fish school behavior exhibited by a fish with respect to other fish implies the behavior following three rules, namely, cohesion, separation, and alignment. The "cohesion" indicates the force by which the fish attempt to remain close to each other in order to not get separated (hereinafter, called the cohesion force). The "separation" indicates the force by which the fish attempt to move away from each other in order to avoid collision (hereinafter, called the separation force). The "alignment" indicates the force for attempting to get lined up to move as a single school of fish (hereinafter, called the alignment force). The behavior exhibited by a fish gets decided by the sum total of these three forces. In the following explanation, the three forces, namely, the cohesion force, the separation force, and the alignment force are collectively referred to as the "fish school parameters". Each of the three forces is decided by the values of parameters indicating the magnitude of the force, the direction of the force, and the range over which the force is exerted. For example, the fish school parameters are decided by the size of the space in which the school of fish is present (for example, the size of the fish preserve), the size of the fish, and the density of the school of fish. In this way, as the values of the fish school parameters, based on the cohesion force by which the fish attempt to remain close to each other in order to not get separated, based on the separation force by which the fish attempt to move away from each other in order to avoid collision, and based on the alignment force for attempting to get lined up to move as a single school of fish; the generating unit 152 controls the behavior of every fish.

Figure 7:
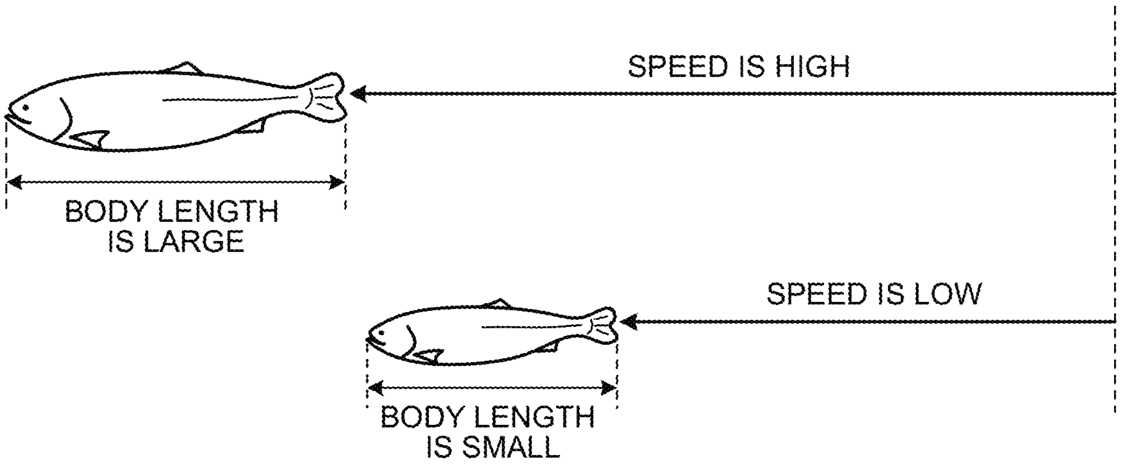
FIG. 7 is a diagram for explaining the relationship between the body length of a fish and the speed of the fish.

FIG. 7 is a diagram for explaining the relationship between the body length of a fish and the speed of the fish. As a biological characteristic of fish, it is known that, greater (smaller) the body length of a fish, the higher (smaller) is the locomotion speed of that fish. Thus, as the value of an internal parameter, based on the body length of a fish belonging to the school of fish, the generating unit 152 controls the behavior of the fish in such a way that the locomotion speed of that fish increases as the body length becomes greater. Moreover, as a biological characteristic of fish, it is known that, greater (smaller) the vibration amplitude of the tail fin of a fish, the higher (lower) is the locomotion speed of that fish. Thus, as the value of an internal parameter, based on the vibration amplitude of the tail fin of a fish belonging to the school of fish, the generating unit 152 can control the behavior of the fish in such a way that the locomotion speed of that fish increases as the vibration amplitude becomes greater.

Figure 8:
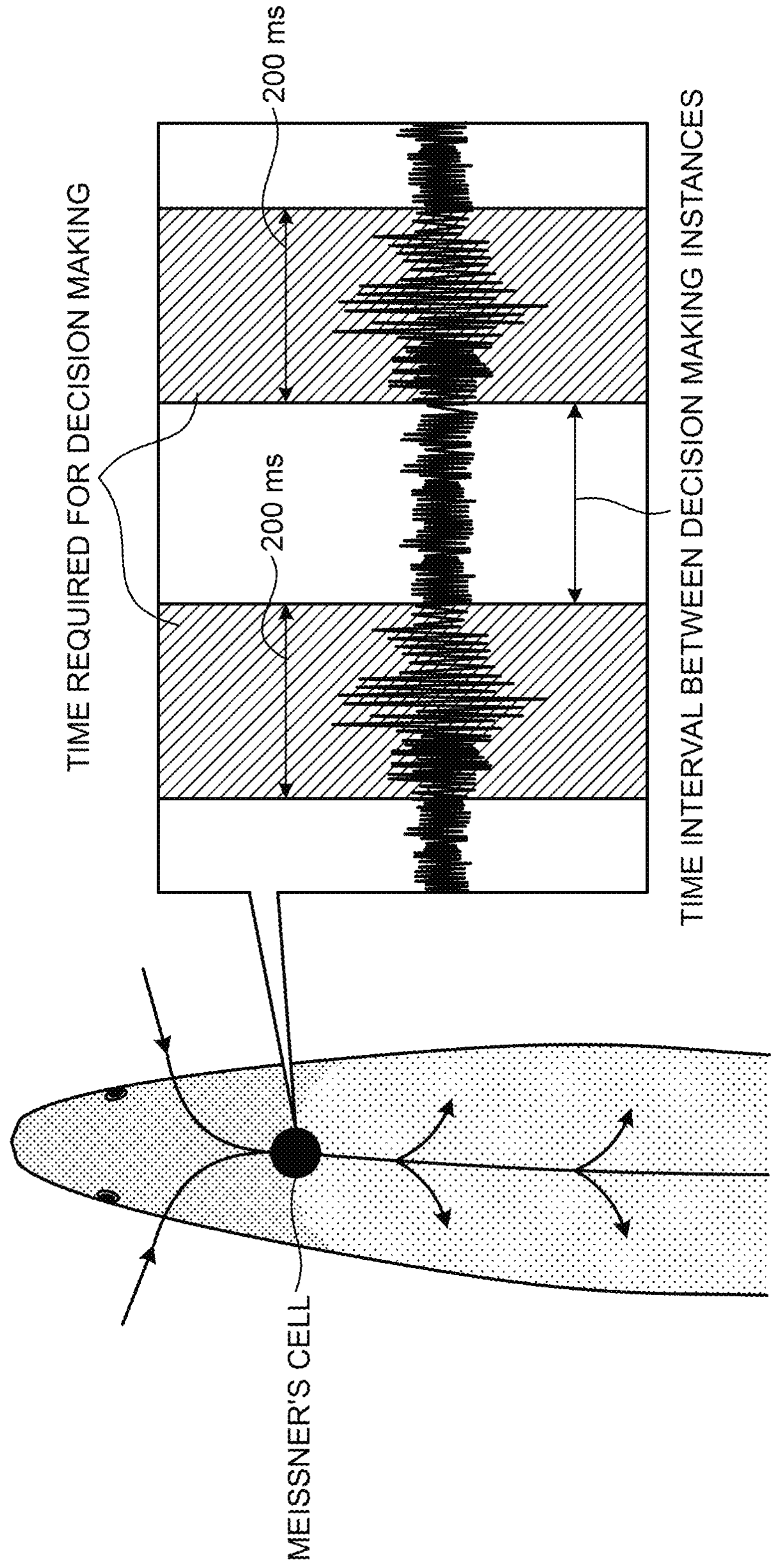
FIG. 8 is a diagram for explaining the relationship of the reaction speed of the Meissner's cell of a fish with the decision-making duration required by the fish and with the time interval between decision making instances.

FIG. 8 is a diagram for explaining the relationship of the reaction speed of the Meissner's cell of a fish with the decision-making duration required by the fish and with the time interval between decision making instances. As a biological characteristic of a fish, it is known that the time required by a fish to make a decision about exhibiting a behavior is decided according to the reaction speed of the Meissner's cell (a type of nerve cell) of that fish. Herein, the decision making of a fish for exhibiting a behavior implies the decision making in which the fish instantaneously decides "where to swim" and "in what manner to swim". In the example illustrated in FIG. 8, the time required by a fish to make a decision about exhibiting a behavior is about 200 milliseconds, and the time interval between two decision making instances is equal to a few hundred milliseconds. Thus, as the value of an internal parameter, based on the decision-making duration required by a fish belonging to the school of fish and based on the time interval between decision making, the generating unit 152 controls the behavior of that fish. More particularly, the generating unit 152 sets the refresh interval of the simulation image to be equal to the decision-making duration (for example, a few hundred milliseconds) that is required by a fish to exhibit a behavior. For example, the generating unit 152 controls the duration that is required by a fish to be in a predetermined state (for example, a "Slow Swim" state illustrated in FIG. 11 (explained later)) to be equal to the time required by the fish to make a decision for exhibiting a behavior (for example, a few hundred millimeters). Then, the generating unit 152 controls the time interval that is required by the fish to change from a predetermined state (for example, the "Slow Swim" state illustrated in FIG. 11 (explained later)) to another state (for example, a "C-start Left" state illustrated in FIG. 11 (explained later)) to be equal to the time required by the fish to make a decision for exhibiting a behavior (for example, a few hundred millimeters).

Moreover, as a biological characteristic of fish, it is known that, lower (higher) the water temperature surrounding a fish (or body temperature of a fish), the slower (faster) is the reaction speed of the Meissner's cell of the fish. Thus, as the value of an internal parameter, based on the decision-making duration that increases as the water temperature surrounding a fish becomes lower and based on the time interval between decision making instances, the generating unit 152 can control the behavior of the fish.

Figure 9:
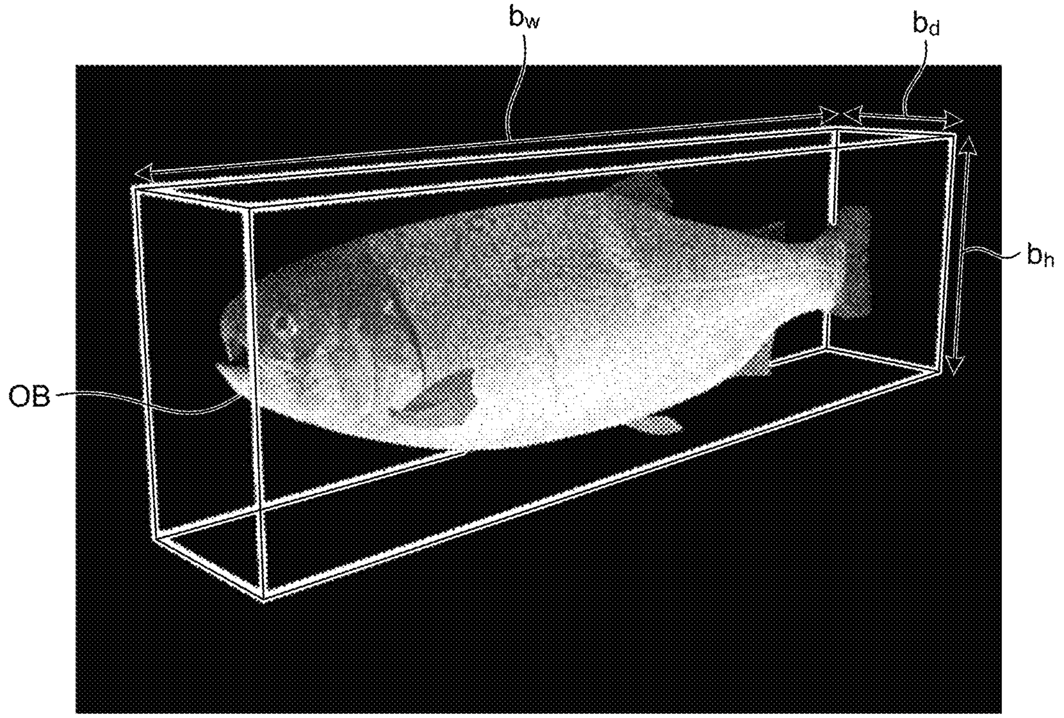
FIG. 9 is a diagram illustrating a three-dimensional CG image of a fish and illustrating a three-dimensional bounding box.

FIG. 9 is a diagram illustrating a three-dimensional CG image of a fish and illustrating a three-dimensional bounding box. The fish illustrated in FIG. 9 is a three-dimensional CG image of the fish generated based on body-side data that is actually measured for every fish species (hereinafter, also called actual data of the fish preserve). The generating unit 152 generates a simulation image using a three-dimensional CG image of a real fish as generated based on the actual data of the fish preserve. Alternatively, the generating unit 152 generates a simulation image using a three-dimensional CG image of a fish that is not generated based on the actual data of the fish preserve. For example, based on the surrounding values of the actual data of the fish preserve (for example, the values within a predetermined range from the representative value of the actually-measured data), the generating unit 152 can generate a simulation image using a three-dimensional CG image of a fish having different body-side data than the actual data of the fish preserve. Moreover, regarding every fish belonging to the school of fish included in the simulation image, the generating unit 152 can vary the body length, the locomotion speed, the initial position, the initial state, and the weight.

In FIG. 9, the frame enclosing the fish represents a three-dimensional bounding box meant for identifying the position information and the size of the fish. The generating unit 152 generates the position information of every fish. For example, the generating unit 152 includes the position information indicating the center position of a fish OB and the existence range of the fish OB. For example, the position information of a fish is generated using three-dimensional coordinate information. In the example illustrated in FIG. 9, the generating unit 152 generates the following information as an example of the position information of the fish OB: information regarding coordinates ($b_x$, $b_y$, $b_z$) (not illustrated) of the center of the fish OB, and information regarding a depth $b_d$, a width $b_w$, and a height $b_h$ of a cuboid (three-dimensional bounding box) of the minimal size in which the fish OB fits.

Figure 10:
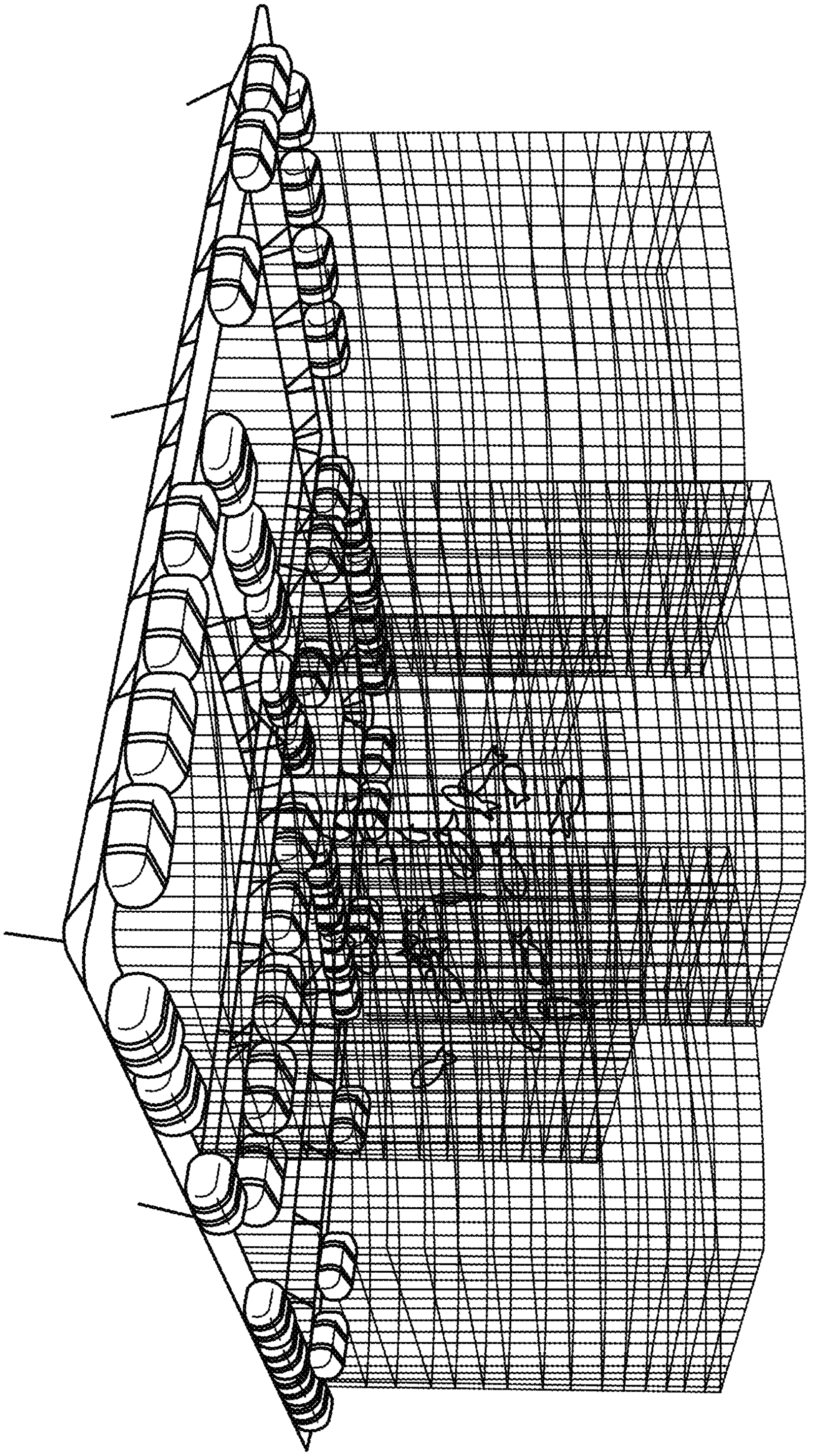
FIG. 10 is a diagram illustrating a three-dimensional CG image of a fish preserve.

FIG. 10 is a diagram illustrating a three-dimensional CG image of a fish preserve. In FIG. 10 is illustrated the three-dimensional CG image of a fish preserve generated based on the latitude/longitude, the water temperature, the light intensity, and underwater image data (hereinafter, also called the actual data of the fish preserve). The generating unit 152 generates a simulation image using a realistic three-dimensional CG image of the fish preserve that is generated based on the actual data of the fish preserve. Alternatively, the generating unit 152 can generate a simulation image using a three-dimensional CG image of the fish preserve that is not based on the actual data of the fish preserve. For example, based on the surrounding values of the actual data of the fish preserve (for example, the values within a predetermined range from the representative value of the actually-measured data), the generating unit 152 can generate a simulation image using a three-dimensional CG image of the fish preserve that includes different data than the actual data of the fish preserve (for example, the values within a predetermined range from the representative values of the actually-measured data such as the size, the depth, the water temperature, and the light intensity of the fish preserve). Still alternatively, based on the values not present in the actual data (for example, the data of the time slot for which the actually-measured data is not available), the generating unit 152 can generate a simulation image using a three-dimensional CG image of the fish preserve that has different data than the actual data of the fish preserve.

Figure 11:
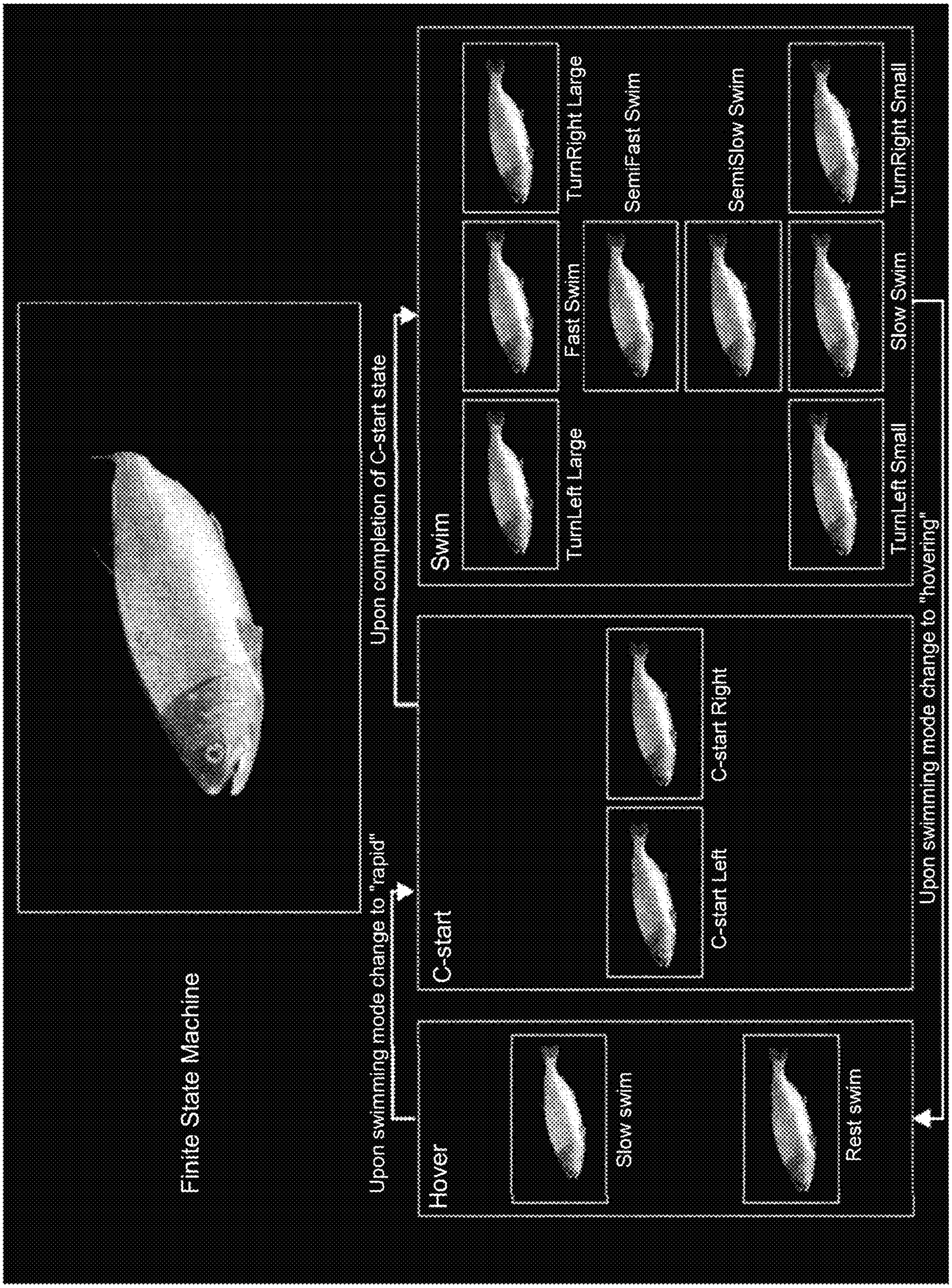
FIG. 11 is a diagram illustrating a finite state machine meant for deciding the state of a fish.

FIG. 11 is a diagram illustrating a finite state machine meant for deciding the state of a fish. As a biological characteristic of the fish, it is known that that the swimming mode (also called the swimming style or the swimming approach) of the fish of every fish species can be classified into specific patterns. Meanwhile, with reference to FIG. 11, the explanation is given about the case in which the fish species is salmon. However, the swimming patterns can be different for every fish species. The generating unit 152 generates 12 types of animations indicating 12 types of swimming states of a fish as illustrated in FIG. 11. Moreover, from among the 12 types of animations, the generating unit 152 decides on the swimming state of every fish based on a finite state machine (FSM), and changes the swimming state of the fish.

For example, the generating unit 152 changes the swimming mode of the fish from the "Slow Swim" state to the "C-start Left" state. Then, the generating unit 152 changes the swimming mode from the "C-start Left" state to a "Fast Swim" state. Subsequently, the generating unit 152 changes the swimming mode from the "Fast Swim" state to a "Semi Fast Swim" state. Then, the generating unit 152 changes the swimming mode from the "Semi Fast Swim" state to the "Slow Swim" state. Subsequently, the generating unit 152 changes the swimming mode of the fish from the "Slow Swim" state to a "Rest Swim" state. Meanwhile, at the time of changing the state, the generating unit 152 can perform interpolation between the pre-change state and the post-change state, so that the animation can be smooth.

Moreover, based on the values of the internal parameters, the values of the external parameters, and the values of the fish school parameters as obtained by the obtaining unit 151, the generating unit 152 controls the behavior of the three-dimensional CG of the fish in such a way that the realistic three-dimensional CG of the fish (see FIG. 9) swim in the three-dimensional simulation space (see FIG. 10) in which a realistic fish preserve is reproduced; and as a result achieves a three-dimensional simulation that is identical to the school of fish swimming in the fish preserve. Then, using a virtual camera installed at a predetermined depth from the water surface in the three-dimensional simulation space in which the fish preserve is reproduced, the generating unit 152 captures the three-dimensional simulation that is identical to the school of fish swimming in the fish preserve, and generates a simulation image.

Upon generating the simulation image, the generating unit 152 can generate training data in which two-dimensional bounding boxes are added that indicate the position information of the fish included in the generated simulation image. Herein, as a result of using the position information of every fish that was used at the time of generating a simulation image, the generating unit 152 can easily generate training data in which two-dimensional bounding boxes are added.

Moreover, upon generating the simulation image, the generating unit 152 can generate training data in which three-dimensional bounding boxes are added that indicate the position information of the fish included in the generated simulation image. Herein, as a result of using the position information of every fish that was used at the time of generating a simulation image, the generating unit 152 can easily generate training data in which three-dimensional bounding boxes are added.

Furthermore, upon generating the simulation image, the generating unit 152 can generate training data in which the fish included in the generated simulation image are changed to silhouette. For example, the generating unit 152 generates training data in which the fish that are changed to silhouette are displayed in a color-coded manner. Herein, the color coding is equivalent to assigning color elements. For example, when a plurality of fish is present, the generating unit 152 can assign a different color for the color coding of every fish, or can assign different colors according to the classification information of the fish.

In the example explained above, the generating unit 152 generates a simulation image, which includes the behavior exhibited by every fish belonging to a school of fish, based on the values of the internal parameters related to the biological characteristics of the fish, based on the values of the external parameters related to the characteristics of the surrounding environment of the fish, and based on the values of the fish school parameters related to the characteristics of the fish school behavior indicating the behavior exhibited by a fish with respect to other fish. However, the types of the parameters are not limited to the types explained above. Explained below with reference to FIGS. 12 to 15 is a case in which the generating unit 152 generates a simulation image not only based on the internal parameters, the external parameters, and the fish school parameters, but also based on color parameters related to the characteristics of the color of the water in which the fish are present. More particularly, the obtaining unit 151 obtains the values of the internal parameters, the values of the external parameters, the values of the fish school parameters, and the values of the color parameters. More particularly, the obtaining unit 151 obtains the values of the internal parameters, the values of the external parameters, the values of the fish school parameters, and the values of the color parameters as input by the user via the input unit 130. Then, based on the values of the internal parameters, the values of the external parameters, the values of the fish school parameters, and the values of the color parameters as obtained by the obtaining unit 151, the generating unit 152 generates a simulation image that includes the behavior exhibited by the fish belonging to the school of fish.

Figure 12:
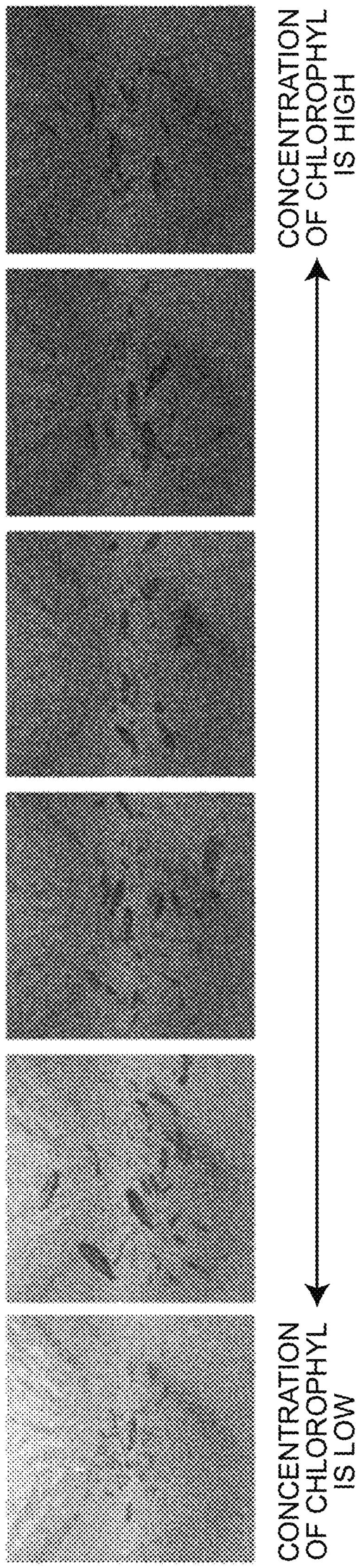
FIG. 12 is a diagram illustrating an example of simulation images obtained as a result of a parameter indicating the concentration of the chlorophyl according to the embodiment.

FIG. 12 is a diagram illustrating an example of simulation images obtained as a result of a parameter indicating the concentration of the chlorophyl according to the embodiment. Among the six images illustrated in FIG. 12, the concentration of the chlorophyl goes on decreasing in the simulation images toward the left side and goes on increasing in the simulation images toward the right side. The chlorophyl represents the green pigment included in the phytoplankton or the algae present in the water. It is known that generally the chlorophyl in the water easily absorbs the light having the wavelength corresponding to the blue color (hereinafter, also called the blue light). For that reason, higher the concentration of the chlorophyl in the water, the easier is the attenuation of the blue light. Hence, it is known that the water having a high concentration of the chlorophyl appears reddish in color. Moreover, the chlorophyl causes murkiness in the water. Hence, the water having a high concentration of the chlorophyl appears reddish in color as well as appears murky. As a result, it is known that the water appears reddish brown in color. Thus, as the value of a color parameter, based on the concentration of the chlorophyl in the water of the fish preserve in which the fish belonging to the school of fish are present, the generating unit 152 generates a simulation image. More particularly, the generating unit 152 generates a simulation image by controlling the RGB values of each pixel in the simulation image in such a way that, higher the concentration of the chlorophyl in the water of the fish preserve, the lower is the luminance value of the blue color (B) from among the RGB values of each pixel in the simulation image.

Figure 13:
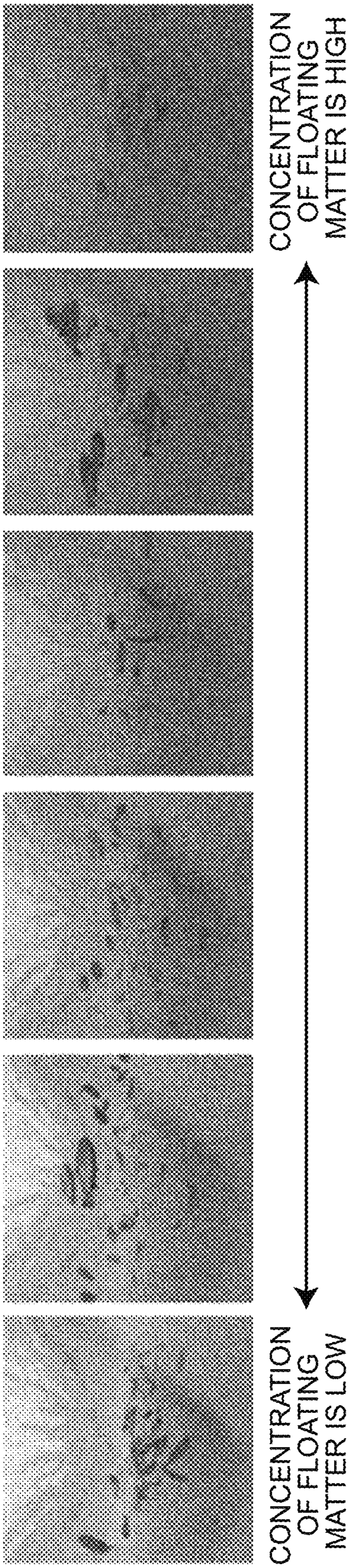
FIG. 13 is a diagram illustrating an example of simulation images obtained as a result of varying a parameter indicating the concentration of the floating matter according to the embodiment.

FIG. 13 is a diagram illustrating an example of simulation images obtained as a result of varying a parameter indicating the concentration of the floating matter according to the embodiment. Among the six images illustrated in FIG. 13, the concentration of the floating matter goes on decreasing in the simulation images toward the left side and goes on increasing in the simulation images toward the right side. The floating matter can be the sand wound up from the bottom of the sea, can be the eggs of shellfish or jellyfish, or can be the garbage. The floating matter causes murkiness in the water. Hence, it is known that the water having a high concentration of the floating matter appears murky. Thus, as the value of a color parameter, based on the concentration of the floating matter in the water of the fish preserve in which the fish belonging to the school of fish are present, the generating unit 152 generates a simulation image. More particularly, the generating unit 152 generates a simulation image by controlling the luminance value of each pixel in the simulation image in such a way that, higher the concentration of the floating matter in the water of the fish preserve, the lower is the luminance value of each pixel in the simulation image.

Figure 14:
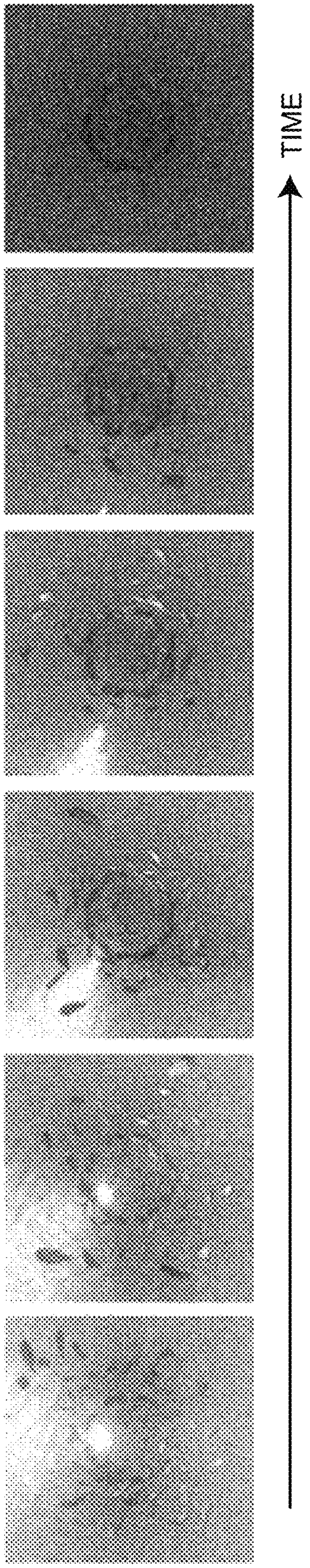
FIG. 14 is a diagram illustrating an example of simulation images obtained as a result of varying parameters indicating the intensity of the sunlight and the depth of the sunlight from the water surface of the fish preserve according to the embodiment.

FIG. 14 is a diagram illustrating an example of simulation images obtained as a result of varying parameters indicating the intensity of the sunlight and the depth of the sunlight from the water surface of the fish preserve according to the embodiment. The six images illustrated in FIG. 14 are simulation images in which the intensity of the sunlight is varied between noon to 6 pm. In the simulation image illustrated at the left end in FIG. 14, the water of the fish preserve appears bright because the intensity of the sunlight is high at noon. In contrast, in the simulation image illustrated at the right end, the water of the fish preserve appears dark because the intensity of the sunlight is low after the sunset. It is a commonly known fact that the absorbance of the light entering a dilute solution such as seawater is proportional to the concentration of the dilute solution and the length of the light path (Lambert-Beer law). If $I_0$ represents the intensity of the light before entering a dilute solution and if I represents the intensity of the light after passing through the dilute solution, then $I/I_0=T$ is called transmission. Moreover, "$-\log T=E$" representing the negative value of the common logarithm of the transmission T is called absorbance. The intensity of the sunlight shining on the water of the fish preserve and the depth of the sunlight from the water surface of the fish preserve changes according to the latitude and the longitude indicating the position of the fish preserve and according to the time. That is, the color of the seawater in the fish preserve changes according to the intensity of the sunlight shining on the water of the fish preserve and the depth of the sunlight from the water surface of the fish preserve. Thus, as the values of color parameters, based on the intensity of the sunlight shining on the water of the fish preserve in which the fish belonging to the school of fish are present and based on the depth of the sunlight from the water surface of the fish preserve, the generating unit 152 generates a simulation image. More particularly, the generating unit 152 generates a simulation image by controlling the luminance value of each pixel of the simulation image in such a way that the Lambert-Beer law is followed.

Figure 15:
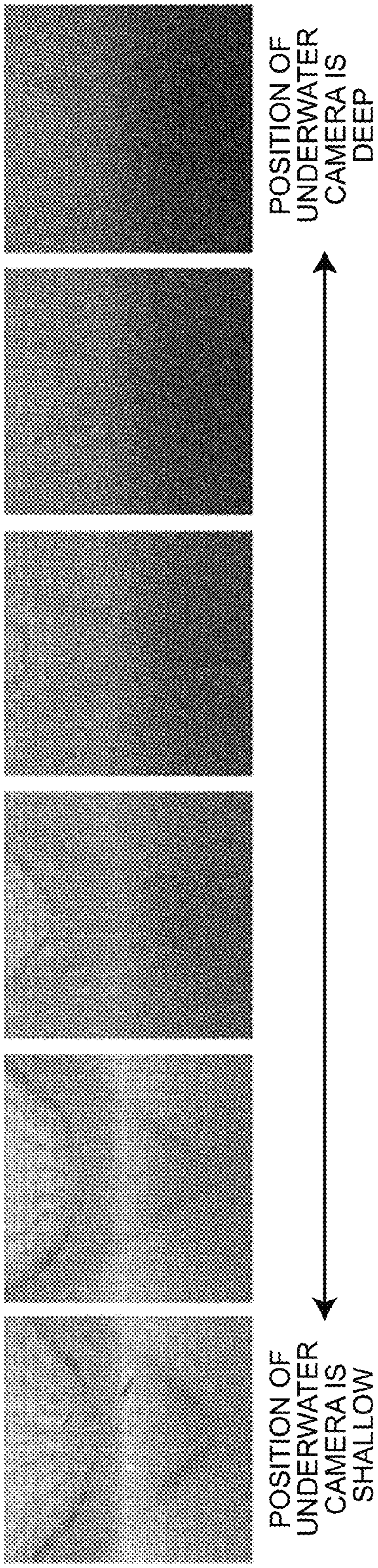
FIG. 15 is a diagram illustrating an example of simulation images obtained as a result of varying a parameter indicating the depth from the water surface to the position of a virtual camera according to the embodiment.

FIG. 15 is a diagram illustrating an example of simulation images obtained as a result of varying a parameter indicating the depth from the water surface to the position of a virtual camera according to the embodiment. Among the six images illustrated in FIG. 15, the position of the virtual camera goes on becoming shallower in the simulation images toward the left side and goes on becoming deeper in the simulation images toward the right side. It is a commonly known fact that more light gets absorbed as the depth from the water surface increases, and the color of the water becomes darker. Thus, as the value of a color parameter, based on the depth from the water surface of the fish preserve, in which the fish belonging to the school of fish is present, to the position of the virtual camera, the generating unit 152 generates a simulation image. More particularly, the generating unit 152 generates a simulation image by controlling the luminance value of each pixel of the simulation image in such a way that, greater the depth from the water surface of the fish preserve to the position of the virtual camera, the smaller is the luminance value of each pixel of the simulation image.

Figure 16:
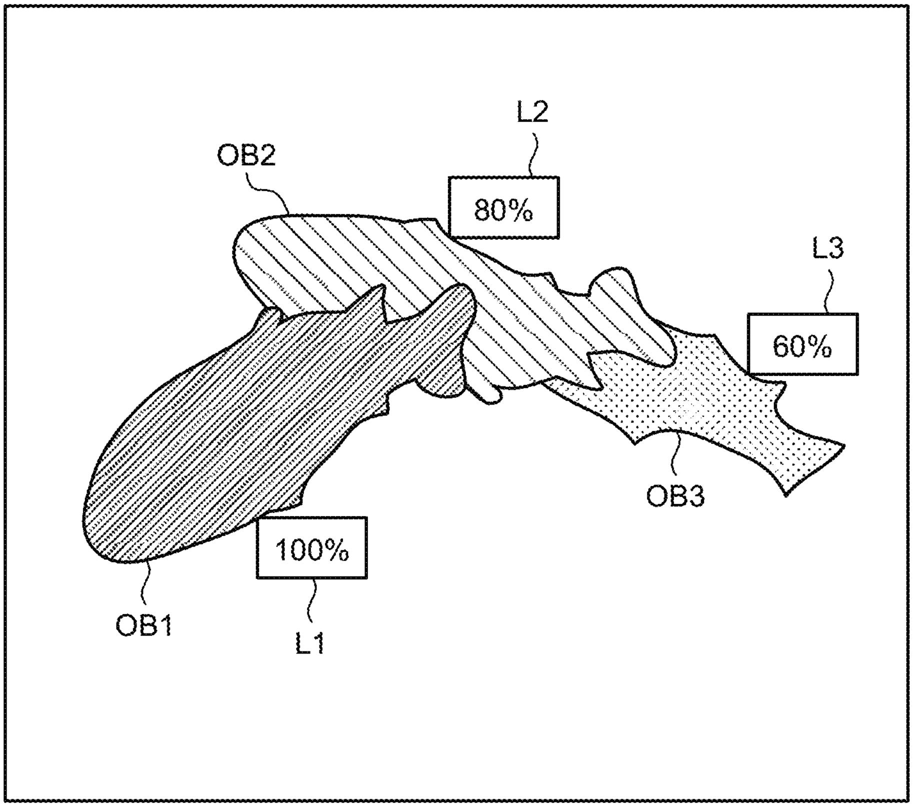
FIG. 16 is a diagram illustrating an example of training data that contains labels indicating the degree of overlapping of the fish included in a simulation image according to the embodiment.

FIG. 16 is a diagram illustrating an example of training data that contains labels indicating the degree of overlapping of the fish included in a simulation image according to the embodiment. In FIG. 16, the fish included in the simulation image are changed to silhouette. Moreover, with reference to FIG. 16, the obtaining unit 151 obtains a two-dimensional simulation image in which the three-dimensional CG of a plurality of fish swimming in the three-dimensional simulation space, which represents the fish preserve, is captured by a virtual camera.

The generating unit 152 generates a simulation image in which the degree of overlapping of a plurality of fish in the two-dimensional simulation image, which is obtained when the fish present in the three-dimensional simulation space are captured by a virtual camera, is visually displayed. More particularly, based on the simulation image obtained by the obtaining unit 151, the generating unit 152 determines whether or not any of the fish included in the simulation image are apparently overlapping. For example, based on the position coordinates of every fish present in the three-dimensional simulation space and based on the position coordinates of the virtual camera, the generating unit 152 determines whether or not any fish are apparently overlapping in the image when viewed from the position of the virtual camera. With reference to FIG. 16, the generating unit 152 determines that three fish OB1 to OB3 included in the simulation image are apparently overlapping in the image.

Then, based on the position coordinates of every fish present in the three-dimensional simulation space and based on the position coordinates of the virtual camera, the generating unit 152 calculates the information indicating the degree of overlapping of a plurality of fish included in the simulation image. For example, as the information indicating the degree of overlapping, the generating unit 152 calculates the percentage of the area of the viewable region of every fish. With reference to FIG. 16, the fish OB1 present on the foreground is visible in entirety. Hence, the generating unit 152 calculates 100% as the percentage of the area of the viewable region. Regarding the fish OB2 that is present behind the fish OB1, the generating unit 152 calculates 20% as the percentage of the area of the nonviewable region that is partially hidden due to the fish OB1 present in the front, and calculates 80% as the percentage of the area of the viewable region. Regarding the fish OB3 that is present in the background (behind the fish OB2), the generating unit 152 calculates 40% as the percentage of the area of the nonviewable region that is partially hidden due to the fish OB2 present in the front, and calculates 60% as the percentage of the area of the viewable region.

When the information indicating the degree of overlapping is calculated, the generating unit 152 visualizes the information indicating the degree of overlapping, and adds it to the simulation image. For example, the generating unit 152 displays, at a position within a predetermined range from every fish, a label indicating the percentage of the area of the viewable region of that fish. With reference to FIG. 16, the generating unit 152 displays, at a position within a predetermined range from the fish OB1, a label L1 that includes the characters "100%" indicating the percentage of the area of the viewable region of the fish OB1. Moreover, the generating unit 152 displays, at a position within a predetermined range from the fish OB2, a label L2 that includes the characters "80%" indicating the percentage of the area of the viewable region of the fish OB2. Furthermore, the generating unit 152 displays, at a position within a predetermined range from the fish OB3, a label L3 that includes the characters "60%" indicating the percentage of the area of the viewable region of the fish OB3.

Figure 17:
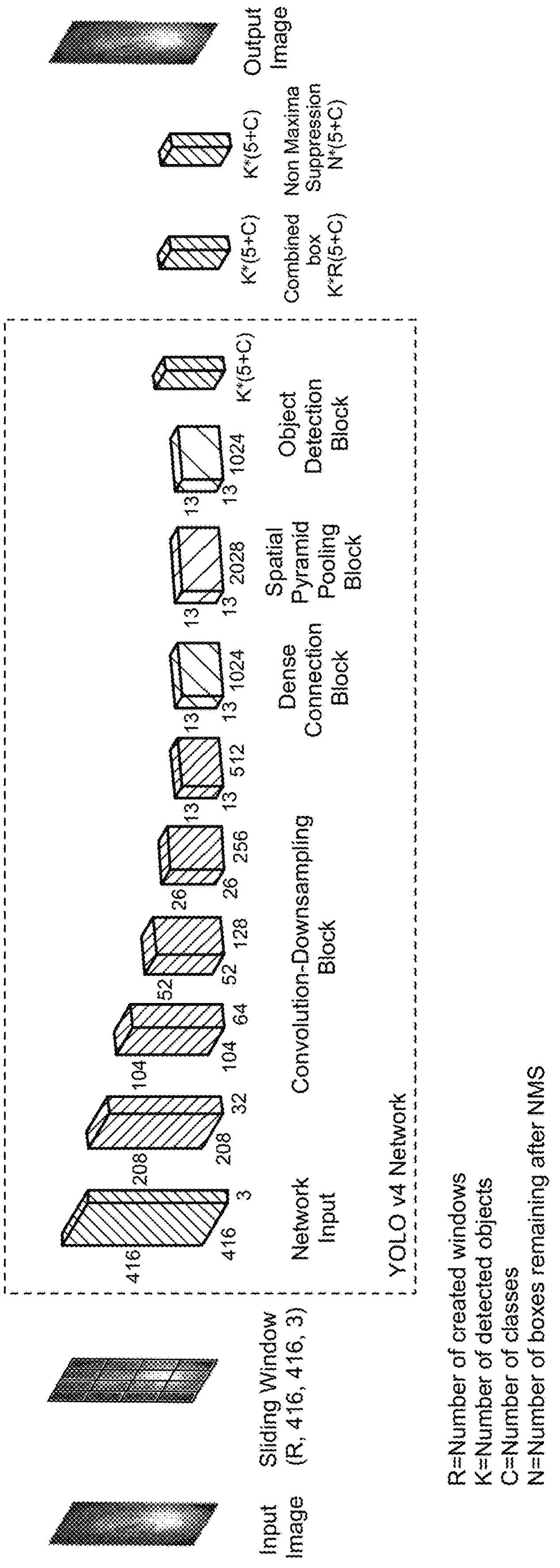
FIG. 17 is a diagram illustrating an example of a machine learning model according to the embodiment.

FIG. 17 is a diagram illustrating an example of a machine learning model according to the embodiment. The machine learning model illustrated in FIG. 17 includes a neural network of the YOLO type (YOLO stands for You Only Look Once). When a simulation image is input to the machine learning model, the generating unit 152 trains the machine learning model to output individual-fish identification information of every fish included in the simulation image and to output the information corresponding to the individual-fish identification information of the fish (for example, the number of fish). Meanwhile, the neural network is not limited to the YOLO type; and the generating unit 152 can alternatively implement, in the machine learning model, any known neural network for object detection. For example, instead of using a neural network of the YOLO type, the generating unit 152 cam implement Faster R-CNN, which is developed for object detection, or single shot multibox detector (SSD) in the machine learning model.

For example, when the generated simulation image is input to a machine learning model M1, the generating unit 152 trains the machine learning model M1 to output a simulation image in which three-dimensional bounding boxes each of which indicates the position information of an identified fish are displayed in a superimposed manner, and to output the number of identified fish (the number of fish present in the school of fish).

Moreover, when the generated simulation image is input to a machine learning model M2, the generating unit 152 trains the machine learning model M2 to output a simulation image in which two-dimensional bounding boxes each of which indicates the size of an identified fish are displayed in a superimposed manner, and to output the number of identified fish (the number of fish present in the school of fish).

Furthermore, when the generated simulation image is input to a machine learning model M3, the generating unit 152 trains the machine learning model M3 to output a simulation image in which every identified fish is changed to silhouette, and to output the number of identified fish (the number of fish present in the school of fish).

When the generated simulation image is input to each of the machine learning models M1 to M3, the generating unit 152 trains each of the machine learning models M1 to M3 to output a simulation image in which the information obtained by visualizing the information indicating the degree of overlapping of a plurality of fish in the simulation image is displayed in a superimposed manner. For example, when the generated simulation image is input to each of the machine learning models M1 to M3, the generating unit 152 trains each of the machine learning models M1 to M3 to output a simulation image in which labels each of which indicates the percentage of the area of the viewable region of one of a plurality of fish in the simulation image are displayed in a superimposed manner.

In this way, when a simulation image is input to a machine learning model, the generating unit 152 trains the machine learning model to output correct-solution data generated based on the parameter information used in generating the simulation image or to output the information corresponding to the correct-solution data.

Estimating Unit 153

The estimating unit 153 uses the already-trained machine learning model generated by the generating unit 152, and estimates the information related to a plurality of target subjects from a taken image in which the target subjects are captured. For example, the estimating unit 153 uses the already-trained machine learning model generated by the generating unit 152, and estimates the information related to the school of fish from a taken image in which the school of fish is captured.

Moreover, the estimating unit 153 estimates, as the information related to a plurality of target subjects, the number of target subjects captured in the taken image. For example, the estimating unit 153 inputs the taken image in the already-trained machine learning model M2 generated by the generating unit 152. Then, the estimating unit 153 makes the machine learning model M2 output the following: the taken image in which two-dimensional bounding boxes are displayed in a superimposed manner along with the superimposed display of the labels each of which indicates the percentage of the area of the viewable region of a fish captured in the taken image; and the number of identified fish (the number of fish present in the school of fish). The estimating unit 153 treats the information output from the machine learning model M2 as the estimation result.

Output Control Unit 154

Figure 18:
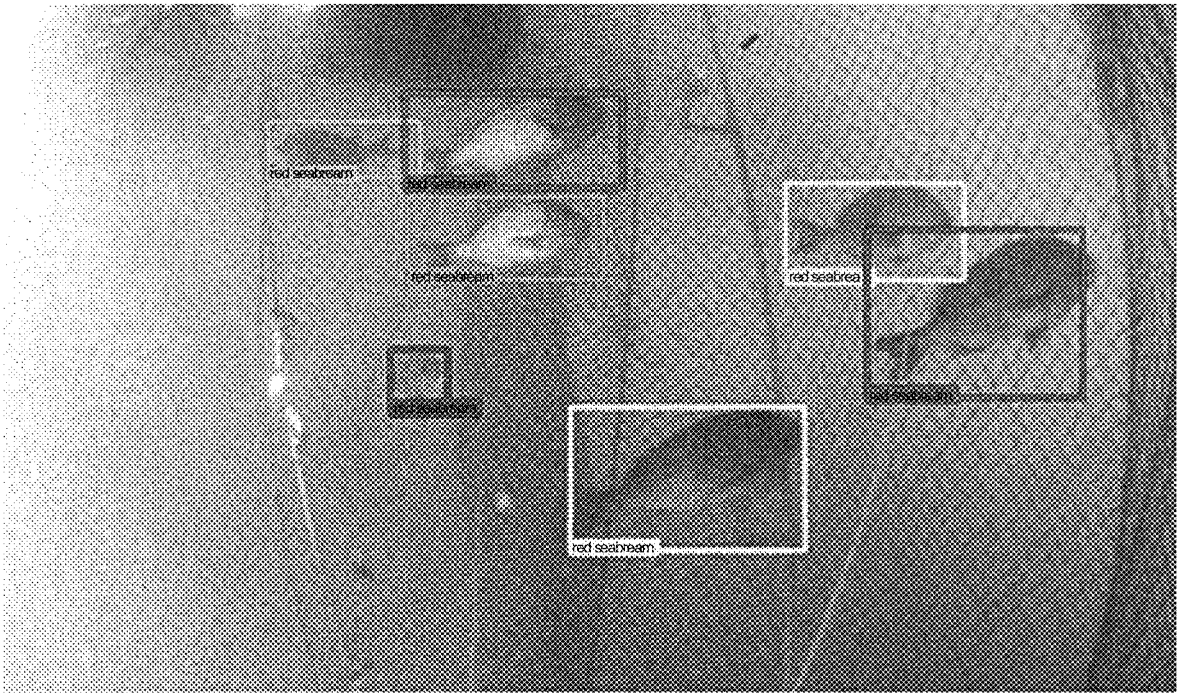
FIGS. 18 to 20 are diagrams illustrating examples of a screen in which the estimation result regarding a taken image is output.
Figure 19:
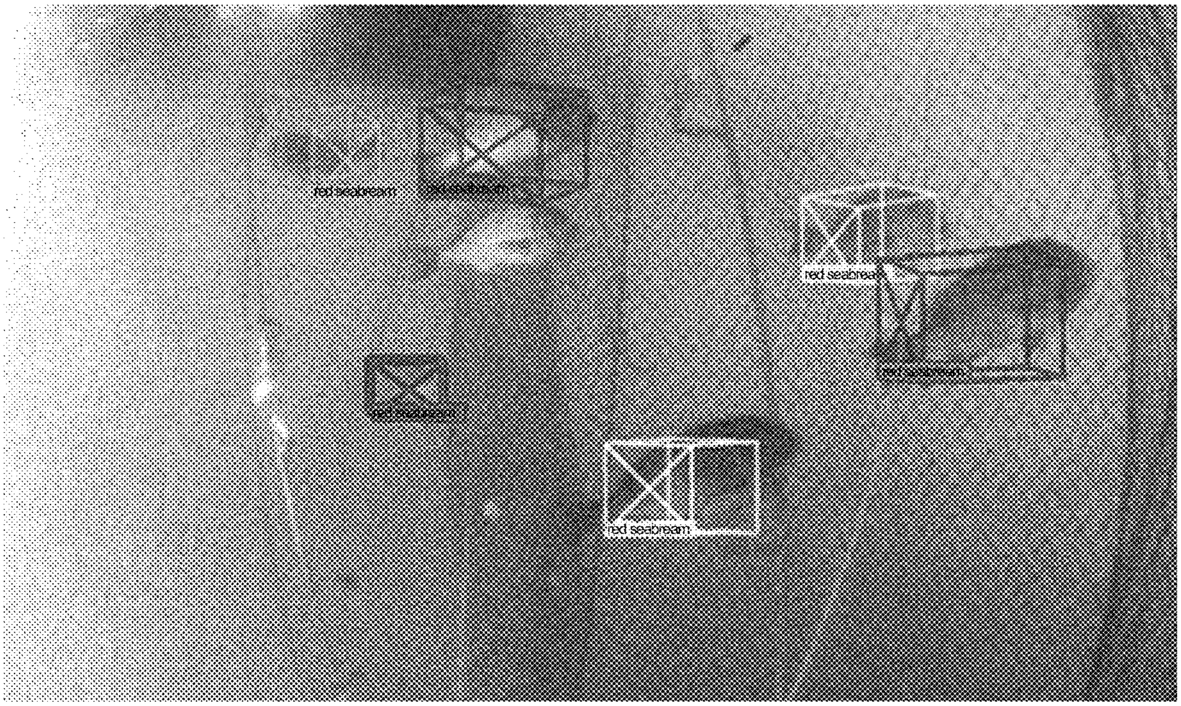
Figure 20:
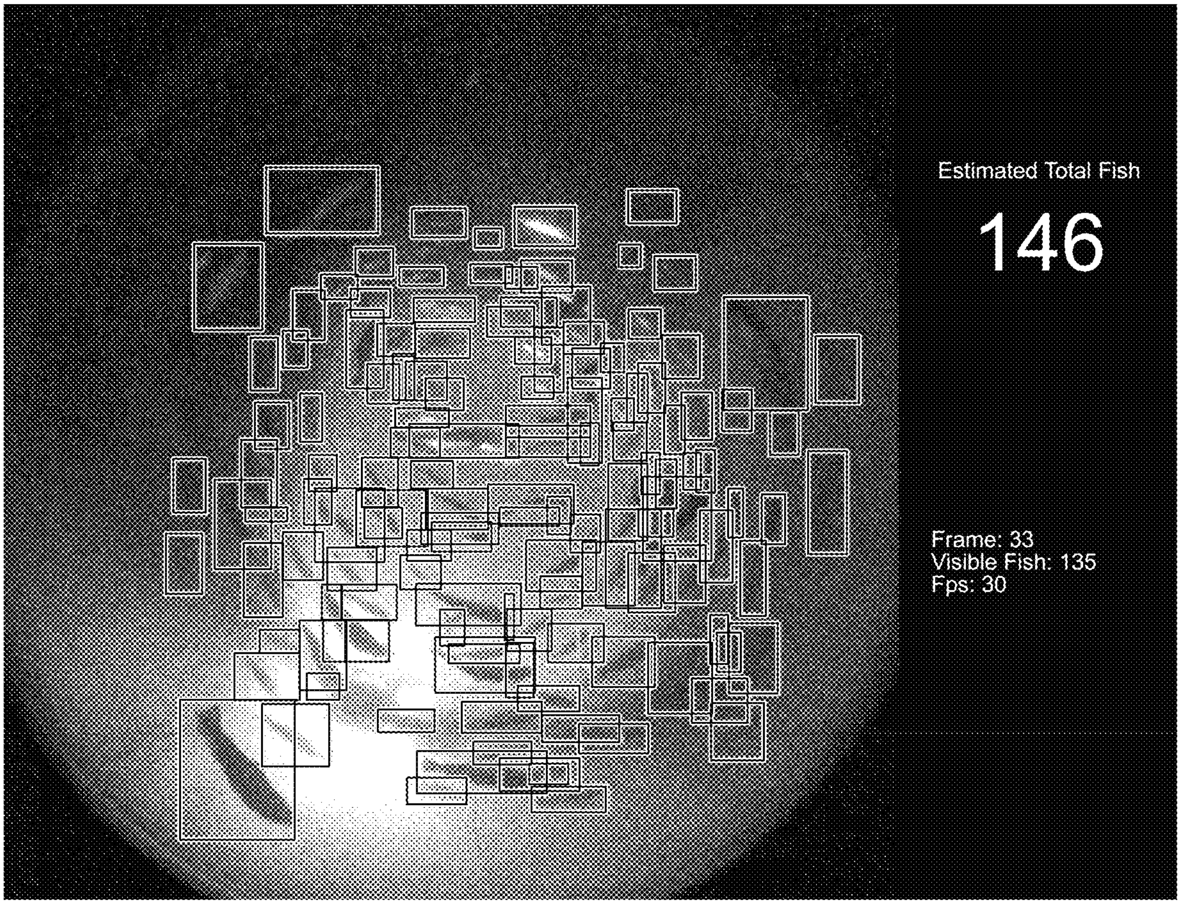

The output control unit 154 performs control to display the estimation result, which is obtained by the estimating unit 153, in a screen. FIGS. 18 to 20 are diagrams illustrating examples of a screen in which the estimation result regarding a taken image is output.

In the example illustrated in FIG. 18, the output control unit 154 displays, in a screen, the taken image in which, as the estimation result obtained by the estimating unit 153, bounding boxes enclosing the fish detected from the taken image, and labels indicating the types of the detected fish are displayed in a superimposed manner. Moreover, the output control unit 154 can also display, in the screen, the taken image in which, as the estimation result obtained by the estimating unit 153, labels each of which indicates the percentage of the area of the viewable region of a detected fish are displayed in a superimposed manner.

In the example illustrated in FIG. 19, the output control unit 154 displays, in the screen, the taken image in which, as the estimation result obtained by the estimating unit 153, three-dimensional bounding boxes enclosing the fish detected from the taken image and labels indicating the types of the detected fish are displayed in a superimposed manner. Moreover, the output control unit 154 can also display, in the screen, the taken image in which, as the estimation result obtained by the estimating unit 153, labels each of which indicates the percentage of the area of the viewable region of a detected fish are displayed in a superimposed manner.

In the example illustrated in FIG. 20, as the estimation result obtained by the estimating unit 153, the output control unit 154 displays, in a screen, the taken image in which two-dimensional bounding boxes are added, and a count "146" indicating the number of identified fish (the number of fish present in the school of fish).

Meanwhile, in the embodiment described above, it is a fish that represents the target subject included in a simulation image, and a plurality of fish present in a school of fish represents a plurality of target subjects. However, the target subjects included in a simulation image are not limited to the fish. Alternatively, for example, other than the fish, the target subjects included in a simulation image can be persons, animals, or vehicles. Moreover, the information processing device 100 can generate a simulation image that visually displays the information indicating the degree of overlapping of a plurality of target subjects (for example, a plurality of persons, a plurality of animals, or a plurality of vehicles) in a two-dimensional simulation image that is obtained when the target subjects present in a three-dimensional simulation space are captured by a virtual camera.

3. Effects

As explained above, the information processing device 100 according to the embodiment includes the obtaining unit 151 and the generating unit 152. The obtaining unit 151 obtains a two-dimensional simulation image when a plurality of target subjects present in a three-dimensional space is captured by a virtual camera. The generating unit 152 generates a simulation image for visually displaying the information that indicates the degree of overlapping of a plurality of target subjects in a two-dimensional simulation image, which is formed when the target subjects present in a three-dimensional simulation space is captured by a virtual camera.

In this way, instead of using a taken image in which a plurality of target objects present in a three-dimensional space is captured, the information processing device 100 uses a simulation image that is formed when a plurality of target subjects present in a three-dimensional space is captured by a virtual camera. As a result, the information processing device 100 becomes able to automatically calculate the information indicating the degree of overlapping of a plurality of target subjects included in the simulation image. Moreover, since the information indicating the degree of overlapping of a plurality of target subjects can be added as the annotation in the simulation image, the information processing device 100 can generate accurate and high-quality training data with ease. As a result, for example, the information processing device 100 enables training of a machine learning model, which is meant for estimating the information related to a plurality of target subjects (for example, the number of target subjects) captured in the taken image, in a large volume of high-quality training data. That is, as a result of carrying out the training using a large volume of high-quality training data, for example, the information processing device 100 becomes able to enhance the estimation accuracy of the machine learning model that is meant for estimating the information related to a plurality of target subjects (for example, the number of target subjects) captured in the taken image. Hence, the information processing device 100 enables accurate estimation of the information related to a plurality of target subjects.

Moreover, based on the position coordinates of each of a plurality of target subjects present in the three-dimensional simulation space and based on the position coordinates of the virtual camera, the generating unit 152 calculates the degree of overlapping of the target subjects in the simulation image.

Thus, the information processing device 100 can add, as the annotation in the simulation image, the information indicating the degree of overlapping of a plurality of target subjects; and hence can easily generate accurate and high-quality training data to be used in the training of a machine learning model meant for estimating the information related to the target subjects captured in a taken image (for example, information such as the number of target subjects).

When a simulation image is input to a machine learning model, the generating unit 152 trains the machine learning model to output the correct-solution data generated based on the parameter information used in generating simulation images or to output the information corresponding to the correct-solution data.

As a result, for example, the information processing device 100 enables training of a machine learning model, which is meant for estimating the information related to a plurality of target subjects (for example, the number of target subjects) captured in the taken image, in a large volume of high-quality training data. That is, as a result of carrying out the training using a large volume of high-quality training data, the information processing device 100 becomes able to, for example, enhance the estimation accuracy of the machine learning model that is meant for estimating the information related to a plurality of target subjects (for example, the number of target subjects) captured in the taken image.

The information processing device 100 further includes the estimating unit 153 that uses the already-trained machine learning model generated by the generating unit 152 and estimates the information related to a plurality of target subjects from a taken image in which the target subjects are captured.

Thus, as a result of carrying out the training using a large volume of high-quality training data, the information processing device 100 becomes able to, for example, enhance the estimation accuracy of the machine learning model that is meant for estimating the information related to a plurality of target subjects (for example, the number of target subjects) captured in the taken image. For example, the information processing device 100 becomes able to enhance the estimation accuracy of the machine learning model that is meant for estimating the information related to a school of fish (for example, the number of fish) captured in a taken image. Thus, the information processing device 100 can accurately estimate the information related to a plurality of target subjects.

Meanwhile, the estimating unit 153 estimates, as the information related to a plurality of target subjects, the number of target subjects captured in the taken image.

Thus, the information processing device 100 can accurately estimate the number of target subjects included in the taken image.

Herein, a target subject implies a fish, and a plurality of target subjects implies a plurality of fish present in a school of fish.

In this way, instead of using a taken image in which a school of fish actually present in a three-dimensional space (for example, a fish preserve) is captured, the information processing device 100 uses a simulation image that is formed when a school of fish present in a three-dimensional simulation space is captured by a virtual camera. As a result, the information processing device 100 becomes able to automatically calculate the information indicating the degree of overlapping of a plurality of fish included in the simulation image. Moreover, since the information indicating the degree of overlapping of a plurality of fish can be added as the annotation in the simulation image, the information processing device 100 can generate accurate and high-quality training data with ease. As a result, for example, the information processing device 100 enables training of a machine learning model, which is meant for estimating the information related to a plurality of target subjects (for example, the number of target subjects) captured in the taken image, in a large volume of high-quality training data. That is, as a result of carrying out the training using a large volume of high-quality training data, the information processing device 100 becomes able to, for example, enhance the estimation accuracy of the machine learning model that is meant for estimating the information related to a plurality of target subjects (for example, the number of target subjects) captured in the taken image. Hence, the information processing device 100 enables accurate estimation of the information related to the school of fish.

The obtaining unit 151 obtains the values of the internal parameters related to the biological characteristics of the fish; obtains the values of the external parameters related to the characteristics of the surrounding environment of the fish; obtains the values of the fish school parameters related to the characteristics of the fish school behavior indicating the behavior exhibited by a fish toward other fish; and obtains the values of the color parameters related to the characteristics of the color of the water in which the fish are present. Then, based on the values of the internal parameters, the values of the external parameters, the values of the fish school parameters, and the values of the color parameters as obtained by the obtaining unit 151; the generating unit 152 generates a simulation image that includes the behavior exhibited by every fish belonging to the school of fish.

In this way, based on the information related to the biological characteristics of the fish, based on the information related to the surrounding environment of the fish, based on the information related to the characteristics of the fish school behavior exhibited by the fish, and based on the information related to the characteristics of the color of the water in which the fish are present; the information processing device 100 generates a simulation image that includes the behavior exhibited by the school of fish. Hence, the behavior exhibited by the school of fish present in an actual fish preserve can be reproduced with accuracy. Moreover, the information processing device 100 varies the values of a plurality of parameters used in generating simulation images, and thus can easily generate a large number of simulation image covering a wide range of patterns. Furthermore, the information processing device 100 can utilize the values of the parameters, which are used in generating simulation images, as the correct-solution data. Hence, as compared to the case of manually assigning the correct-solution data, a large volume of high-quality training data can be generated with ease.

Moreover, based on the values of the internal parameters, the values of the external parameters, the values of the fish school parameters, and the values of the color parameters; the generating unit 152 controls the behavior exhibited by every fish belonging to the school of fish, and generates a simulation image.

Thus, based on the information related to the biological characteristics of the fish, based on the information related to the surrounding environment of the fish, based on the information related to the characteristics of the fish school behavior exhibited by the fish, and based on the information related to the characteristics of the color of the water in which the fish are present; the information processing device 100 controls the behavior exhibited by every fish belonging to the school of fish. As a result, the behavior exhibited by the school of fish present in the actual fish preserve can be reproduced with accuracy. As a result, for example, the information processing device 100 enables training of a machine learning model, which is meant for estimating the information related to a school of fish (for example, the number of fish) captured in the taken image, in a large volume of high-quality training data.

Meanwhile, as the value of a color parameter, based on the concentration of the chlorophyl in the water of the fish preserve in which the fish belonging to the fish school are present, the generating unit 152 generates a simulation image.

Thus, the information processing device 100 becomes able to easily generate a large volume of training data containing simulation images having different appearances according to the concentration of the chlorophyl in the water. Hence, the information processing device 100 enables training of a machine learning model using the training data containing the generated simulation images, thereby enabling achieving enhancement in the estimation accuracy of the machine learning model.

Moreover, as the value of a color parameter, based on the concentration of the floating matter in the water of the fish preserve in which the fish belonging to the fish school are present, the generating unit 152 generates a simulation image.

Thus, the information processing device 100 becomes able to easily generate a large volume of training data containing simulation images having different appearances according to the concentration of the floating matter in the water. Hence, the information processing device 100 enables training of a machine learning model using the training data containing the generated simulation images, thereby enabling achieving enhancement in the estimation accuracy of the machine learning model.

Furthermore, as the values of color parameters, based on the intensity of the sunlight shining on the water of the fish preserve in which the fish belonging to the fish school are present and based on the depth of the sunlight from the water surface of the fish preserve, the generating unit 152 generates a simulation image.

Thus, the information processing device 100 becomes able to easily generate a large volume of training data containing simulation images having different appearances according to the intensity of the sunlight shining on the water and the depth of the sunlight from the water surface of the fish preserve. Hence, the information processing device 100 enables training of a machine learning model using the training data containing the generated simulation images, thereby enabling achieving enhancement in the estimation accuracy of the machine learning model.

Moreover, as the value of a color parameter, based on the depth from the water surface of the fish preserve, in which the fish belonging to the fish school are present, to the position of the virtual camera, the generating unit 152 generates a simulation image.

Thus, the information processing device 100 becomes able to easily generate a large volume of training data containing simulation images having different appearances according to the depth from the water surface to the position of the virtual camera. Hence, the information processing device 100 enables training of a machine learning model using the training data containing the generated simulation images, thereby enabling achieving enhancement in the estimation accuracy of the machine learning model.

Meanwhile, when a simulation image is input to a machine learning model, the generating unit 152 trains the machine learning model to output the correct-solution data generated based on the parameter information used in generating the simulation image or to output the information corresponding to the correct-solution data.

As a result, for example, the information processing device 100 enables training of a machine learning model, which is meant for estimating the information regarding a school of fish (for example, the number of fish) captured in the taken image, in a large volume of high-quality training data. That is, as a result of carrying out the training of a machine learning model, which is meant for estimating the information regarding the school of fish (for example, the number of fish) from the taken image, in a large volume of high-quality training data, the information processing device 100 enables achieving enhancement in the estimation accuracy of the machine learning model.

The information processing device 100 further includes the estimating unit 153 that uses the already-trained machine learning model generated by the generating unit 152 and estimates the information related to the school of fish from a taken image in which the school of fish is captured.

Thus, as a result of carrying out the training using a large volume of high-quality training data, for example, the information processing device 100 becomes able to enhance the estimation accuracy of the machine learning model that is meant for estimating the information related to the school of fish (for example, the number of fish) captured in the taken image. Hence, using the already-trained machine learning model, the information processing device 100 can accurately estimate the information related to the school of fish. Moreover, for example, in the case of estimating the number of fish in the school of fish captured in the taken image, the information processing device 100 implements image recognition and hence becomes able to accurately estimate the information related to the school of fish without directly touching the fish (i.e., in a contactless manner). That enables achieving reduction in the burden on the fish. Moreover, as a result of implementing the image recognition, as compared to the case of manually scooping the fish using a net, the information processing device 100 can obtain a highly accurate estimation result in a short period of time.

4. Hardware Configuration

Figure 21:
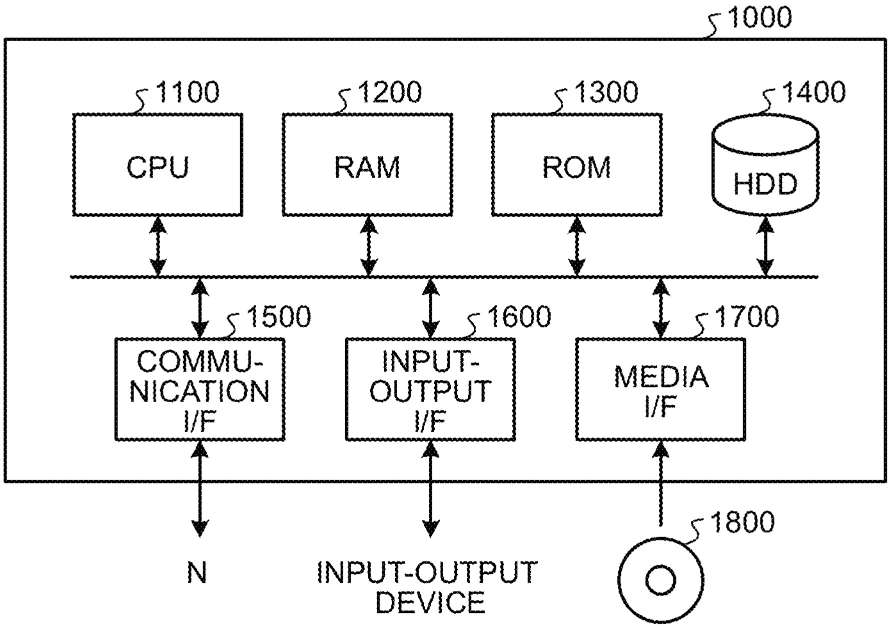
FIG. 21 is a hardware configuration diagram illustrating an example of a computer that implements the functions of the information processing device.

The information processing device 100 according to the embodiment described above is implemented using, for example, a computer 1000 having a configuration as illustrated in FIG. 21. FIG. 21 is a hardware configuration diagram illustrating an example of the computer 1000 that implements the functions of the information processing device 100. The computer 1000 includes a CPU 1100, a RAM 1200, a ROM 1300, an HDD 1400, a communication interface (I/F) 1500, an input-output interface (I/F) 1600, and a media interface (I/F) 1700.

The CPU 1100 performs operations based on a computer program stored in the ROM 1300 or in the HDD 1400, and controls the other constituent elements. The ROM 1300 is used to store a boot program that is executed by the CPU 1100 at the time of booting of the computer 1000, and to store computer programs that are dependent on the hardware of the computer 1000.

The HDD 1400 is used to store the computer programs to be executed by the CPU 1100, and to store the data used in those computer programs. The communication interface 1500 receives data from other devices via a predetermined communication network and sends that data to the CPU 1100; as well as sends the data generated by the CPU 1100 to other devices via a predetermined communication network.

The CPU 1100 controls, via the input-output interface 1600, output devices, such as a display and a printer, and input devices, such as a keyboard and a mouse. The CPU 1100 obtains data from an input device via the input-output interface 1600. Moreover, the CPU 1100 outputs the generated data to an output device via the input-output interface 1600.

The media interface 1700 reads the computer programs and the data stored in the recording medium 1800, and provides them to the CPU 1100 via the RAM 1200. The CPU 1100 loads the computer programs from the recording medium 1800 in the RAM 1200 via the media interface 1700, and executes the programs. The recording medium 1800 is, for example, an optical recording medium such as a DVD (Digital Versatile Disc) or a PD (Phase change rewritable Disk); or a magneto-optical recording medium such as an MO (Magneto-Optical disk); or a tape medium; or a magnetic recording medium; or a semiconductor memory.

For example, when the computer 1000 functions as the information processing device 100 according to the embodiment, the CPU 1100 of the computer 1000 executes computer programs loaded in the RAM 1200 and implements the functions of the control unit 150. Herein, the CPU 1100 of the computer 1000 reads the computer programs from the recording medium 1800 and executes them. Alternatively, as another example, the CPU 1100 of the computer 1000 can obtain the computer programs from other devices via a predetermined communication network.

Till now, the embodiment of the application concerned was described in detail based on the accompanying drawings. However, that embodiment is only exemplary, and is to be construed as embodying all modifications and alternative constructions that may occur to one skilled in the art that fairly fall within the basic teaching herein set forth.

5. Miscellaneous

Of the processes described in the embodiment, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings can be changed as required unless otherwise specified. For example, a variety of information illustrated in the drawings is not limited to that information.

The constituent elements of the device illustrated in the drawings are merely conceptual, and need not be physically configured as illustrated. The constituent elements, as a whole or in part, can be separated or integrated either functionally or physically based on various types of loads or use conditions.

The embodiments and the modification examples can be appropriately combined without causing any contradictions in the operation details.

Moreover, the terms "section", "module", and "unit" mentioned above can be read as "device" or "circuit". For example, a generating unit can be read as a generating device or a generating circuit.

According to an aspect of the embodiment, the information related to a plurality of target subjects can be estimated with accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing method implemented in a computer, comprising:

obtaining a two-dimensional simulation image that is formed when a plurality of fish present in a three-dimensional simulation space is captured by a virtual camera; and generating, for use as training data for a machine learning model, a second simulation image that visually displays information indicating a degree of overlapping of the plurality of fish in the two-dimensional simulation image by adding a numerical label to each of the plurality of fish, the numerical label indicating the degree of overlapping, wherein the numerical label comprises characters indicating a percentage of a viewable area of each of the plurality of fish, the percentage of the viewable area being calculated based on occlusion of each fish by one or more other fish positioned between the fish and the virtual camera, and each of the plurality of fish is displayed as a silhouette in the second simulation image.

2. The information processing method according to claim 1, wherein the generating includes calculating, based on position coordinates of each of the plurality of fish present in the three-dimensional simulation space and based on position coordinates of the virtual camera, the information indicating the degree of overlapping for each of the plurality of fish in the two-dimensional simulation image.

3. The information processing method according to claim 1, further comprising:

training the machine learning model by inputting the second simulation image to the machine learning model, wherein the training includes training the machine learning model to output correct-solution data that is generated based on parameter information used in generating the two-dimensional simulation image or to output information corresponding to the correct-solution data derived from the parameter information.

4. The information processing method according to claim 3, further comprising:

estimating, using a trained machine learning model, information related to the plurality of fish from a taken image in which the plurality of fish is captured.

5. The information processing method according to claim 4, wherein the estimating includes estimating, as the information related to the plurality of fish, a count of the plurality of fish captured in the taken image.

6. The information processing method according to claim 3, wherein the second simulation image further includes a two-dimensional bounding box for each of the plurality of fish, and the correct-solution data includes the degree of overlapping indicated by the numerical label and position information indicated by the two-dimensional bounding box.

7. The information processing method according to claim 1, wherein the plurality of fish included in a school of fish.

8. A non-transitory computer-readable storage medium having stored therein a program that causes a computer to execute a process comprising:

obtaining a two-dimensional simulation image that is formed when a plurality of fish present in a three-dimensional simulation space is captured by a virtual camera; and generating, for use as training data for a machine learning model, a second simulation image that visually displays information indicating a degree of overlapping of the plurality of fish in the two-dimensional simulation image by adding a numerical label to each of the plurality of fish, the numerical label indicating the degree of overlapping, wherein the numerical label comprises characters indicating a percentage of a viewable area of each of the plurality of fish, the percentage of the viewable area being calculated based on occlusion of each fish by one or more other fish positioned between the fish and the virtual camera, and each of the plurality of fish is displayed as a silhouette in the second simulation image.

9. The non-transitory computer-readable storage medium of claim 7, wherein the generating includes calculating, based on position coordinates of each of the plurality of fish present in the three-dimensional simulation space and based on position coordinates of the virtual camera, the information indicating the degree of overlapping for each of the plurality of fish in the two-dimensional simulation image.

10. The non-transitory computer-readable storage medium of claim 8, wherein the process includes training the machine learning model by inputting the second simulation image to the machine learning model, and the training includes training the machine learning model to output correct-solution data that is generated based on parameter information used in generating the two-dimensional simulation image or to output information corresponding to the correct-solution data derived from the parameter information.

11. The non-transitory computer-readable storage medium of claim 9, wherein the process further comprises:

estimating, using a trained machine learning model, information related to the plurality of fish from a taken image in which the plurality of fish are captured.

12. The non-transitory computer-readable storage medium of claim 11, wherein the estimating includes estimating, as the information related to the plurality of fish, a count of the plurality of fish captured in the taken image.

13. The non-transitory computer-readable storage medium of claim 8, wherein the plurality of fish are included in a school of fish.

14. An information processing system comprising:

circuitry configured to:

obtain a two-dimensional simulation image which is formed when a plurality of fish present in a three-dimensional simulation space is captured by a virtual camera; and generate, for use as training data for a machine learning model, a second simulation image which visually displays information indicating a degree of overlapping of the plurality of fish in the two-dimensional simulation image by adding a numerical label to each of the plurality of fish, the numerical label indicating the degree of overlapping, wherein the numerical label comprises characters indicating a percentage of a viewable area of each of the plurality of fish, the percentage of the viewable area being calculated based on occlusion of each fish by one or more other fish positioned between the fish and the virtual camera, and each of the plurality of fish is displayed as a silhouette in the second simulation image.

15. The information processing system of claim 14, wherein the circuitry is configured to calculate, based on position coordinates of each of the plurality of fish present in the three-dimensional simulation space and based on position coordinates of the virtual camera, the information indicating the degree of overlapping for each of the plurality of fish in the two-dimensional simulation image.

16. The information processing system of claim 14, wherein the circuitry is configured to train the machine learning model by inputting the second simulation image to the machine learning model, and the training includes training the machine learning model to output correct-solution data that is generated based on parameter information used in generating the two-dimensional simulation image or to output information corresponding to the correct-solution data derived from the parameter information.

17. The information processing system of claim 16, wherein the circuitry is configured to estimate, using a trained machine learning model, information related to the plurality of fish from a taken image in which the plurality of fish is captured.

18. The information processing system of claim 17, wherein the circuitry is configured to estimate, as the information related to the plurality of fish, a count of the plurality of fish captured in the taken image.

19. The information processing system of claim 14, wherein the plurality of fish are a plurality of fish included in a school of fish.

* * * * *